US008653704B2

(12) United States Patent
Atarashi et al.

(10) Patent No.: US 8,653,704 B2
(45) Date of Patent: Feb. 18, 2014

(54) VEHICLE DRIVE SYSTEM

(75) Inventors: Tomoo Atarashi, Kariya (JP); Hirotaka Yata, Kariya (JP); Isao Fujishima, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 307 days.

(21) Appl. No.: 13/107,203

(22) Filed: May 13, 2011

(65) Prior Publication Data
US 2011/0298314 A1 Dec. 8, 2011

(30) Foreign Application Priority Data

Jun. 8, 2010 (JP) ................................. 2010-131216

(51) Int. Cl.
H02K 9/00 (2006.01)
(52) U.S. Cl.
USPC ..................... 310/54; 310/52; 310/58; 310/63
(58) Field of Classification Search
USPC .............. 310/11, 52, 54, 58, 63, 62, 90, 119; 74/467; 123/41.63; 202/175; 417/220; 475/159
See application file for complete search history.

(56) References Cited

U.S. PATENT DOCUMENTS

| 2004/0124722 | A1 | 7/2004 | Uchida et al. | |
| 2009/0026061 | A1* | 1/2009 | Gsell et al. | 202/175 |
| 2010/0035715 | A1* | 2/2010 | Ortmann et al. | 475/5 |
| 2010/0132504 | A1* | 6/2010 | Miller et al. | 74/606 A |

FOREIGN PATENT DOCUMENTS

| JP | A-58-174973 | 10/1983 |
| JP | A-61-84663 | 4/1986 |
| JP | A-2004-215360 | 7/2004 |
| JP | A-2005-83471 | 3/2005 |
| JP | A-2006-197774 | 7/2006 |

OTHER PUBLICATIONS

International Search Report dated Jun. 7, 2011 in International Application No. PCT/JP2011/060270 (with translation).

* cited by examiner

Primary Examiner — Tran Nguyen
Assistant Examiner — Jose Gonzalez Quinones
(74) Attorney, Agent, or Firm — Oliff PLC

(57) ABSTRACT

A vehicle drive system configured with a dynamo within a case. The case is disposed on at least one axial side of the dynamo, and includes a wall portion overlapping the dynamo, which has a section that overlaps with the dynamo as viewed from the axial direction. The wall portion overlapping the dynamo includes a supply flow passage through which lubricating-cooling fluid flows, and which is formed with a first supply portion that supplies lubricating-cooling fluid to a rotor support bearing for the dynamo electric. The first supply portion includes a throttle portion whose flow passage cross-sectional area is small when compared to an upstream-side flow passage cross-sectional area in the flow direction of lubricating-cooling fluid. The supply flow passage includes a second supply portion that is a portion supplying lubricating-cooling fluid to the dynamo and higher than the first supply portion.

20 Claims, 7 Drawing Sheets

VEHICLE DRIVE SYSTEM

INCORPORATION BY REFERENCE

The disclosure of Japanese Patent Application No. 2010-131216 filed on Jun. 8, 2010 including the specification, drawings and abstract is incorporated herein by reference in its entirety.

BACKGROUND OF THE INVENTION

The present invention relates to a vehicle drive system that includes a dynamo electric machine; and a case that accommodates the dynamo electric machine, wherein the case is disposed on either axial side with respect to the dynamo electric machine, and includes a wall portion overlapping the dynamo electric machine which has a section that overlaps with the dynamo electric machine as viewed from the axial direction.

DESCRIPTION OF THE RELATED ART

Art described in Japanese Patent Application Publication No. JP-A-2004-215360 (paragraphs 0025, 0026 and 0033, FIG. 1, etc.) below, for example, is an example of related art for the vehicle drive system described above. The vehicle drive system disclosed in JP-A-2004-215360 includes a configuration in which oil accumulated in an oil reservoir provided at an upper portion of a case drips from above to a dynamo electric machine to cool the dynamo electric machine, and the oil accumulated in the oil reservoir is also supplied through an oil passage to a bearing to lubricate the bearing. This description of background art cites the reference signs of JP-A-2004-215360 below. To give a more specific description of the configuration according to JP-A-2004-215360, oil accumulated in an oil reservoir C1 drips to an electric motor M through orifices 33$f$, 33$r$ formed in the oil reservoir C1 to cool the electric motor M. The oil reservoir C1 is connected to a discharging fluid passage L7, and oil is supplied to the bearing through a fluid passage that branches from the discharging fluid passage L7 and passes through the orifice 39, thus lubricating the bearing. Although not clearly stated in JP-A-2004-215360, it should be noted that a bearing that supports a rotor of a dynamo electric machine (referred to as a "rotor support bearing" below) is an example of a bearing that requires lubrication.

A flow passage for lubricating-cooling fluid (oil) formed in the vehicle drive system is preferably formed in a manner that suppresses an increase in the size of the case and an increase in manufacturing costs. However, in JP-A-2004-215360, the disclosure of a configuration that includes a flow passage (the discharging fluid passage L7) that is connected to a common lubricating-cooling fluid supply source (the oil reservoir C1) has no specific description regarding how to form the flow passage to enable a supply of oil from the lubricating-cooling fluid supply source to both a bearing (e.g. the rotor support bearing) and a dynamo electric machine (the electric motor M). Therefore, a configuration that can suitably supply lubricating-cooling fluid to the rotor support bearing and the dynamo electric machine while suppressing an increase in the size of the case and an increase in manufacturing costs has yet to be revealed.

SUMMARY OF THE INVENTION

Hence, the realization of a vehicle drive system that can suitably supply lubricating-cooling fluid to a rotor support bearing and a dynamo electric machine while suppressing an increase in the size of a case and an increase in manufacturing costs is desired.

A vehicle drive system according to a first aspect of the present invention includes a dynamo electric machine; and a case that accommodates the dynamo electric machine. The case is disposed on at least one axial side with respect to the dynamo electric machine, and includes a wall portion overlapping the dynamo electric machine which has a section that overlaps with the dynamo electric machine as viewed from the axial direction. The wall portion overlapping the dynamo electric machine includes a supply flow passage through which lubricating-cooling fluid flows, and which is formed with a first supply portion that is a portion supplying lubricating-cooling fluid to a rotor support bearing that supports a rotor of the dynamo electric machine. In addition, the first supply portion includes a throttle portion whose flow passage cross-sectional area is small compared to an upstream-side flow passage cross-sectional area in the flow direction of lubricating-cooling fluid. Further, the supply flow passage includes a second supply portion that is a portion supplying lubricating-cooling fluid to the dynamo electric machine and higher than the first supply portion.

In the present application, the "dynamo electric machine" is used as an idea that includes any one of a motor (electric motor), a generator (electric generator), and a motor/generator that carries out both the functions of a motor and a generator as necessary.

Further, "having a section that overlaps as viewed from a certain direction" with respect to the arrangement of two members refers to the fact that, when using that certain direction as a line of sight and moving a viewpoint to each direction perpendicular to that line of sight, there exists a viewpoint at which the two members appear to overlap in at least some regions.

According to the first aspect, the wall portion overlapping the dynamo electric machine is provided with the supply flow passage that includes both the first supply portion that is a portion supplying lubricating-cooling fluid to the rotor support bearing, and the second supply portion that is a portion supplying lubricating-cooling fluid to the dynamo electric machine. Therefore, lubricating-cooling fluid can be suitably supplied to the rotor support bearing and the dynamo electric machine while suppressing an increase in the size of the case and an increase in manufacturing costs.

Specifically, in a configuration where the case includes the wall portion overlapping the dynamo electric machine as intended by the present application, the rotor support bearing that supports the rotor of the dynamo electric machine is often provided in the wall portion overlapping the dynamo electric machine. With regard to this point, according to the first aspect described above, the supply flow passage formed with the first supply portion is provided in the wall portion overlapping the dynamo electric machine. Thus, the supply flow passage can have a small and simple configuration especially in the vicinity of the first supply portion. If the wall portion overlapping the dynamo electric machine is disposed adjacent to the dynamo electric machine in the axial direction, the distance between the supply flow passage and the dynamo electric machine can be made short, whereby the supply flow passage can have a small and simple configuration in the vicinity of the second supply portion. According to the first aspect described above, the supply flow passage can have small and simple configurations in the vicinity of both the first supply portion and the second supply portion, which suppresses an increase in the size of the case and an increase in manufacturing costs, and enables a suitable supply of lubricating-cooling fluid to the rotor support bearing and the dynamo electric machine.

Further, because the first supply portion and the second supply portion are formed in a common flow passage (the supply flow passage) instead of mutually separate flow passages, lubricating-cooling fluid can be supplied to both the first supply portion and the second supply portion by simply supplying lubricating-cooling fluid to the supply flow passage. Thus, a mechanism supplying lubricating-cooling fluid to the supply flow passage can also have a small and simple configuration, and this consequently suppresses an increase in the size of the case and an increase in manufacturing costs as well.

Further, according to the first aspect described above, it is possible to have a configuration capable of achieving both a state in which lubricating-cooling fluid is mainly supplied to the rotor support bearing through the first supply portion, and a state in which lubricating-cooling fluid is supplied to the rotor support bearing through the first supply portion and also supplied to the dynamo electric machine through the second supply portion.

Specifically, according to the first aspect described above, because the first supply portion has the throttle portion, an amount of lubricating-cooling fluid supplied per unit time to the supply flow passage (simply referred to as a "unit supply amount" below) may be smaller than a maximum value of the amount of lubricating-cooling fluid per unit time that can pass through the throttle portion (simply referred to as a "unit flow tolerance" below). In such a state (simply referred to as a "first supply state" below), lubricating-cooling fluid supplied to the supply flow passage is mainly supplied to the rotor support bearing through the first supply portion. However, when the unit supply amount is larger than the unit flow tolerance (simply referred to as a "second supply state" below), the amount of lubricating-cooling fluid supplied to the rotor support bearing through the first supply portion is restricted depending on the unit flow tolerance, and the remaining lubricating-cooling fluid can be supplied to the dynamo electric machine through the second supply portion while suppressing excessive drag loss in the rotor support bearing. Note that because the second supply portion is disposed higher than the throttle portion, it is possible with a simple configuration that utilizes the force of gravity to switch between the supply states of lubricating-cooling fluid to the rotor support bearing and the dynamo electric machine in accordance with the unit flow tolerance.

Here, according to a second aspect of the present invention, the supply flow passage may include an open flow passage portion that has an opening portion, and a closed flow passage portion whose periphery is closed. The closed flow passage portion may communicate with the open flow passage portion on the upstream side of the flow direction of lubricating-cooling fluid, and communicate with the first supply portion on the downstream side of the flow direction of lubricating-cooling fluid. Further, a lowermost portion of the opening portion may be the second supply portion.

According to the second aspect, the first supply portion and the open flow passage portion that includes the second supply portion are connected by the closed flow passage portion whose periphery is closed. Therefore, in the second supply state, a portion of lubricating-cooling fluid among the unit supply amount that exceeds the unit flow tolerance can be more reliably supplied to the open flow passage portion. The second supply portion is the lowermost portion of the opening portion included in the open flow passage portion. Thus, in the second supply state, lubricating-cooling fluid supplied to the open flow passage portion can be suitably supplied to the dynamo electric machine through the second supply portion with a simple configuration that utilizes the force of gravity.

According to a third aspect of the present invention, if the supply flow passage includes the open flow passage portion and the closed flow passage portion as described above, the opening portion may open upward, and a lubricating-cooling fluid supply portion that supplies lubricating-cooling fluid to the supply flow passage may be provided above the opening portion.

According to the third aspect, through lubricating-cooling fluid simply falling from the lubricating-cooling fluid supply portion by the force of gravity, lubricating-cooling fluid can be suitably supplied to the supply passage.

According to a fourth aspect of the present invention, a flow passage formation member that is attached to a face on the dynamo electric machine side in the axial direction of the wall portion overlapping the dynamo electric machine may be further included. The supply flow passage may have a flow passage that is formed by a recessed groove provided on at least one of a mating face of the flow passage formation member and a mating face of the wall portion overlapping the dynamo electric machine at a joined portion between the flow passage formation member and the wall portion overlapping the dynamo electric machine.

According to the fourth aspect, the manufacturing process can be made less complex compared to forming the whole supply flow passage by drilling holes in the wall portion overlapping the dynamo electric machine.

According to a fifth aspect of the present invention, a guidance member that guides lubricating-cooling fluid supplied from the second supply portion to a predetermined location of the dynamo electric machine to be supplied with lubricating-cooling fluid may be further included. The guidance member may include a guidance face that extends from the second supply portion side toward the dynamo electric machine side downward at an angle with respect to the horizontal direction.

According to the fifth aspect, lubricating-cooling fluid can be easily supplied to a desired location with respect to the dynamo electric machine, and when lubricating-cooling fluid is used to cool the dynamo electric machine, the dynamo electric machine can be more efficiently cooled.

In addition, according to a sixth aspect of the present invention, an output member that is drive-coupled to a wheel, and a lubricating-cooling introduction mechanism that supplies lubricating-cooling fluid raked up by the rotation of the output member to the supply flow passage may be further provided.

In the present application, "drive-coupled" refers to a state in which two rotation elements are connected capable of transmitting a driving force (torque), and is used as an idea that includes a state in which the two rotation elements are coupled so as to rotate together, or a state in which the two rotation elements are coupled capable of transmitting a driving force through one, two, or more transmission members. Such transmission members include various types of members that transmit a rotation at the same speed or a changed speed, and include a shaft, a gear mechanism, a belt, and a chain, for example. In addition, such transmission members may include an engagement element that selectively transmits a rotation and a driving force, such as a friction clutch and a dog clutch, for example. However, when "drive-coupled" is used in the context of rotation elements of a differential gear device or a differential mechanism, "drive-coupled" refers to a state in which three or more rotation elements provided in the differential gear device or the differential mechanism are drive-coupled to one another directly and not through other rotation elements.

According to the sixth aspect, by utilizing the rotation of the output member that always rotates while a vehicle having the vehicle drive system travels, lubricating-cooling fluid can be supplied to the rotor support bearing and the dynamo electric machine regardless of the vehicle running mode. Note that if lubricating-cooling fluid thus raked up by the rotation of the output member is supplied to the supply flow passage, the unit supply amount increases as the vehicle speed increases. Therefore, the first supply state occurs at low vehicle speeds, and the second supply state occurs at high vehicle speeds, In the second supply state, the amount of lubricating-cooling fluid supplied to the dynamo electric machine increases as the vehicle speed increases. Thus, the amount of lubricating-cooling fluid supplied to the dynamo electric machine can be increased with an increase in the vehicle speed. Further, lubricating-cooling fluid can suitably cool the dynamo electric machine in cases where the amount of heat generated by the dynamo electric machine increases as the vehicle speed increases. Also, in the second supply state, lubricating-cooling fluid not supplied to the rotor support bearing can be supplied to the dynamo electric machine. Therefore, energy consumed by the output member raking up lubricating-cooling fluid is kept from being wasted.

According to a seventh aspect of the present invention, the vehicle drive system according to the sixth aspect provided with the output member and the lubricating-cooling fluid introduction mechanism as described above may further include: a first dynamo electric machine that is the above dynamo electric machine; a second dynamo electric machine separate from the first dynamo electric machine; an input member that is drive-coupled to an internal combustion engine; a mechanical pump that operates based on the rotation of the input member; and a differential gear device that includes at least a first rotation element, a second rotation element, and a third rotation element. In addition, the first dynamo electric machine may be drive-coupled to the first rotation element, the input member to the second rotation element, and the second dynamo electric machine and the output member to the third rotation element. In an electric running mode in which the internal combustion engine is stopped and the torque of the second dynamo electric machine is transmitted to the output member to drive the wheel, lubricating-cooling fluid may be supplied to the supply flow passage.

According to the seventh aspect, although the mechanical pump does not operate in the electric running mode, lubricating-cooling fluid raked up by the rotation of the output member is supplied to the supply flow passage. Therefore, lubricating-cooling fluid can be suitably supplied to the rotor support bearing and the first dynamo electric machine in the electric running mode as well.

DETAILED DESCRIPTION OF THE EMBODIMENTS

Figure 1:
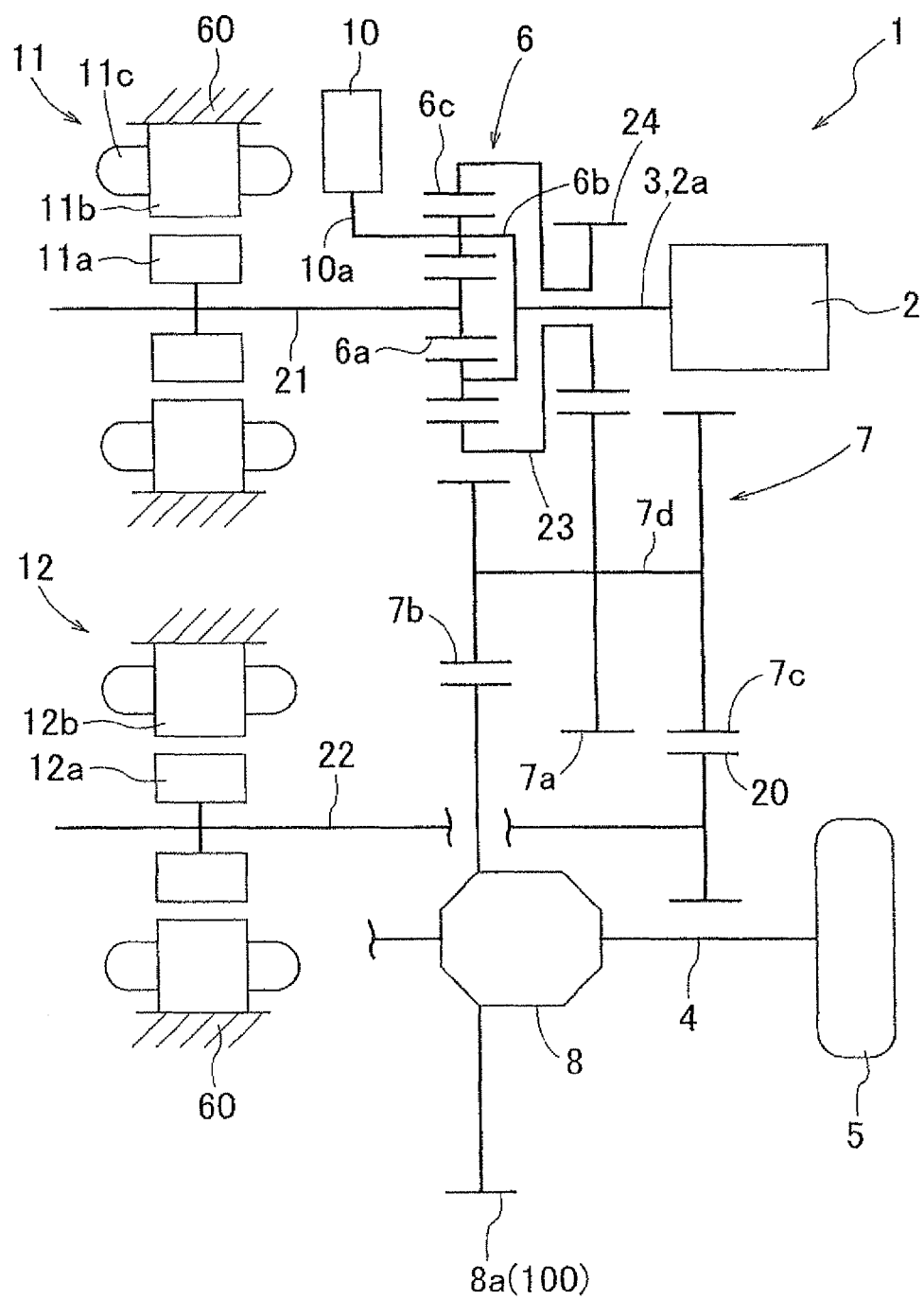
FIG. 1 is a schematic diagram that shows the overall configuration of a vehicle drive system according to an embodiment of the present invention.

An embodiment of the present invention will be described based on the drawings. Here, as an example, the present invention is described as applied to a drive system for a hybrid vehicle. As shown in FIG. 1, a vehicle drive system (simply referred to as a "drive system" below) 1 according to the present invention is a drive system for a hybrid vehicle that can travel using an internal combustion engine 2 and both dynamo electric machines 11, 12 as drive sources. The drive system 1 is a hybrid drive system that is configured so as to be disposed adjacent in the vehicle width direction to the transverse internal combustion engine 2 in the vehicle, and axially coupled to an output shaft of the internal combustion engine 2 (an output shaft 2a of the internal combustion engine). In other words, the drive system 1 is a hybrid drive system for a front engine, front wheel drive (FF) vehicle. The configuration of the drive system 1 according to the present embodiment will be described in detail below in the order of the overall configuration of the drive system, the configuration of a case, and the configuration of an oil passage.

Unless otherwise noted, the "axial direction", the "circumferential direction", and the "radial direction" are defined using a shaft center (a first shaft 101, see FIG. 3) of the first dynamo electric machine as a reference in the following description. Also, unless otherwise noted, in the following description the "one axial side" refers to the left side in FIG. 2, and the back side of the paper in FIG. 3. Further, unless otherwise noted, in the following description the "other axial side" refers to the right side in FIG. 2, and the front side of the paper in FIG. 3.

In the following description, unless otherwise noted, statements pertaining to the arrangement of each member and positional relationships between different members are made based on directions of the drive system 1 in a used state. Therefore, "upper" refers to the vertical upper side of the drive system 1 in a used state, and "lower" refers to the vertical lower side of the drive system 1 in a used state. The up-down direction in FIG. 3 matches the up-down direction (vertical direction) of the drive system 1 in a used state. Note that, because the drive system 1 according to the present invention is a vehicle drive system, the used state of the drive system 1 corresponds to a state in which the drive system 1 is mounted in a vehicle (e.g. a hybrid vehicle, an electric vehicle, or the like).

1. Overall Configuration of Drive System

The overall configuration of the drive system 1 will be described with reference to FIGS. 1 and 2. The drive system 1 includes an input shaft 3 that is drive-coupled to the internal combustion engine 2; an output shaft 4 that is drive-coupled to a wheel 5; the first dynamo electric machine; the second dynamo electric machine 12; a power-distributing differential gear device 6; a counter gear mechanism 7; an output differential gear device 8; an oil pump 10 that operates by the rotation of the input shaft 3; and a case 60 that accommodates these elements. The input shaft 3, the output shaft 4, the power-distributing differential gear device 6, and the oil pump 10 in the present embodiment respectively correspond to an "input member", an "output member", a "differential gear device", and a "mechanical pump" of the present invention.

As shown in FIG. 1, the input shaft 3 is drive-coupled to the internal combustion engine 2. Here, the internal combustion engine 2 is a device that is driven by the combustion of fuel therein to extract power, and various types of commonly known engines such as a gasoline engine and a diesel engine may be used, for example. In the present example, the input shaft 3 is directly drive-coupled to the output shaft 2a of the internal combustion engine. Note that the input shaft 3 is preferably configured so as to be drive-coupled to the output shaft 2a of the internal combustion engine through a damper, a clutch, or the like.

The first dynamo electric machine 11 has a stator 11b that is fixed to the case 60, and a rotor 11a that is rotatably supported on the radial inner side of the stator 11b. Note that the stator 11b includes a coil end portion 11c that is formed by a coil wound around a stator core. The rotor 11a is fixed to a first rotor shaft 21, and is drive-coupled through the first rotor shaft 21 so as to rotate together with a sun gear 6a of the power-distributing differential gear device 6. As shown in FIG. 2, on the one axial side, the first rotor shaft 21 is radially supported by a bearing 9 with respect to the case 60 (in the present example, a pump cover 80 fixed to the case 60). In other words, the rotor 11a of the first dynamo electric machine 11 is radially supported by the bearing 9 with respect to the case 60. In the present embodiment, the rotor 11a provided in the first dynamo electric machine 11 corresponds to a "rotor" of the present invention, and the bearing 9 corresponds to a "rotor support bearing" of the present invention.

Figure 2:
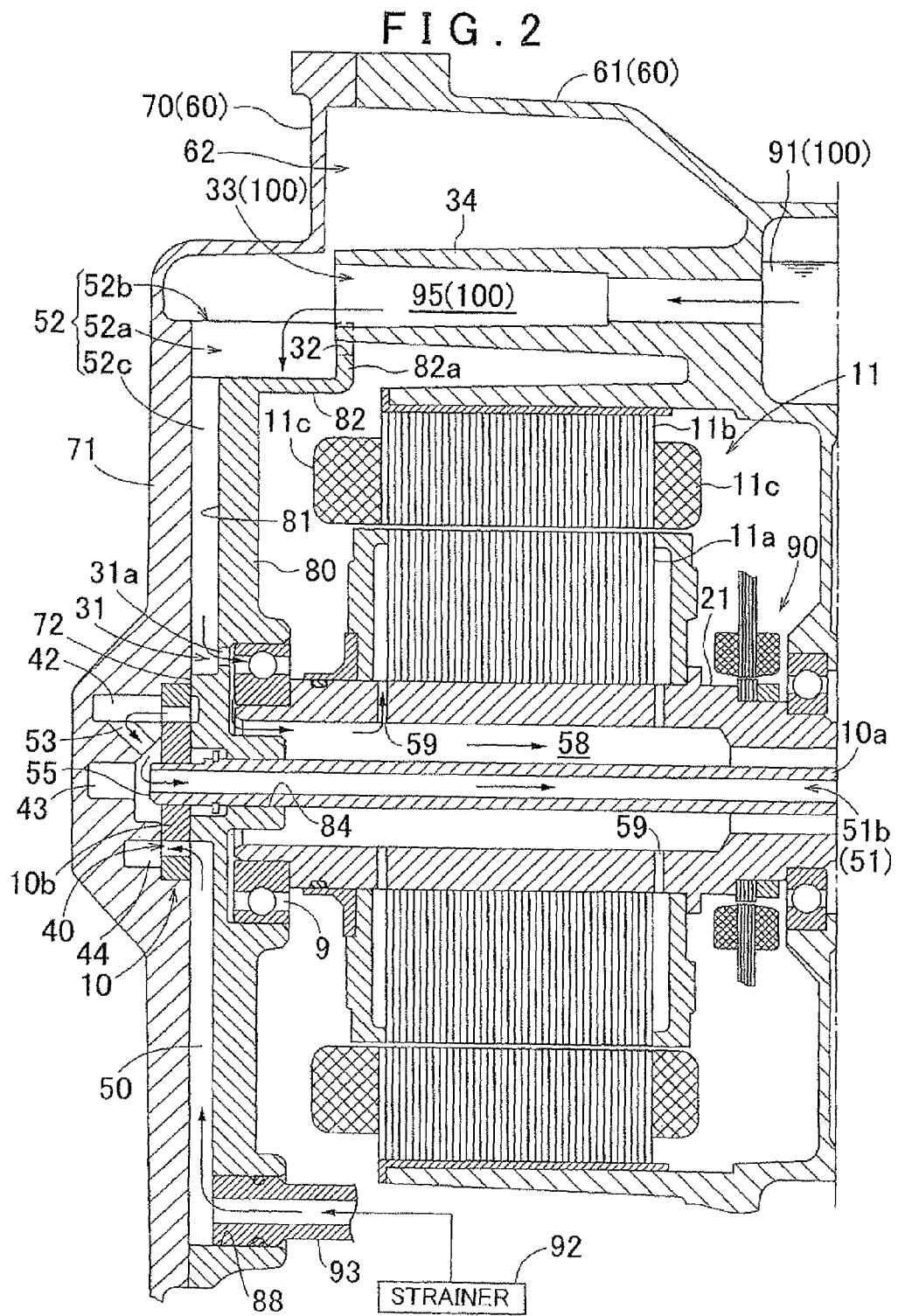
FIG. 2 is a partial cross-sectional view that slices the vehicle drive system according to the embodiment of the present invention in the axial direction.

As shown in FIG. 2, a sensor rotor of a resolver 90 is attached to the first rotor shaft 21 so as to rotate together therewith. The resolver 90 is a sensor for detecting a rotational position (electric angle) and a rotational speed of the rotor 11a with respect to the stator 11b of the first dynamo electric machine 11. In addition, an axial oil passage 58 and a radial oil passage 59 are provided inside the first rotor shaft 21. The radial oil passage 59 is an oil passage for supplying a portion of oil that is supplied to the axial oil passage 58 to a cooling circuit formed in the dynamo electric machine 11. The dynamo electric machine 11 uses the oil supplied to the cooling circuit to cool itself.

The first dynamo electric machine 11 can function as a motor (electric motor) that receives a supply of electric power to generate motive power, and also function as a generator (electric generator) that receives a supply of motive power to generate electric power. Therefore, the first dynamo electric machine 11 is electrically connected to an electric storage device that is not shown in the drawings. In the present example, a battery is used as the electric storage device. Note that a capacitor or the like is also well suited for use as the electric storage device.

As shown in FIG. 1, in the present example, the first dynamo electric machine 11 functions as a generator that generates electricity using the torque of the input shaft 3 (internal combustion engine 2) that is mainly input through the power-distributing differential gear device 6, and supplies electric power for charging the battery or driving the second dynamo electric machine 12. However, at times such as high-speed vehicle travel or starting of the internal combustion engine 2, the first dynamo electric machine 11 may also function as a motor that powers to output a driving force (torque).

The second dynamo electric machine 12 has a stator 12b that is fixed to the case 60, and a rotor 12a that is rotatably supported on the radial inner side of the stator 12b. The rotor 12a is fixed to a second rotor shaft 22, and is drive-coupled through the second rotor shaft 22 so as to rotate together with an output gear 20 of the second dynamo electric machine. The second dynamo electric machine 12 can function as a motor (electric motor) that receives a supply of electric power to generate motive power, and also function as a generator (electric generator) that receives a supply of motive power to generate electric power. Therefore, the second dynamo electric machine 12 is also electrically connected to a battery acting as an electric storage device. In the present example, the second dynamo electric machine 12 mainly functions as a motor for supplementing the driving force (torque) for running the vehicle. Note that in an electric (EV) running mode described later, the internal combustion engine 2 is in a stopped state with its fuel supply stopped, and the vehicle runs using only the driving force (torque) of the second dynamo electric machine 12. In addition, at times such as vehicle deceleration, the second dynamo electric machine 12 may also function as a generator that regenerates the inertial force of the vehicle as electric energy.

In the present embodiment, the power-distributing differential gear device 6 is a single pinion type of planetary gear mechanism that is coaxially disposed with the input shaft 3. Specifically, the power-distributing differential gear device 6 has three rotation elements: a carrier 6b that supports a plurality of pinion gears, and the sun gear 6a and a ring gear 6c that each mesh with a pinion gear. The sun gear 6a is drive-coupled to the first dynamo electric machine 11, and more specifically, drive-coupled so as to rotate together with the first rotor shaft 21 to which the rotor 11a of the first dynamo electric machine 11 is fixed. The carrier 6b is drive-coupled to the input shaft 3, and more specifically, drive-coupled so as to rotate together with the input shaft 3. The ring gear 6c is drive-coupled to the second dynamo electric machine 12 and the output shaft 4, and more specifically, integratedly formed with a distribution output member 23 that is drive-coupled to the second dynamo electric machine 12 and the output shaft 4. The three rotation elements provided in the power-distributing differential gear device 6 are, in order of rotational speed, the sun gear 6a, the carrier 6b, and the ring gear 6c. Note that the order of rotational speed is either the order of rotational speed from the high speed side to the low speed side or the order of rotational speed from the low speed side to the high speed side. Either order can be achieved based on the rotation state of the planetary gear mechanism that constitutes the power-distributing differential gear device 6, and the order of the rotation elements does not change in either case. The sun gear 6a, the carrier 6b, and the ring gear 6c in the present embodiment respectively correspond to a "first rotation element", a "second rotation element", and a "third rotation element" of the present invention.

The power-distributing differential gear device 6 is constituted so as to be capable of distributing and transmitted the torque of the internal combustion engine 2, which is transmitted to the input shaft 3, to the first dynamo electric machine 11 and the distribution output member 23. To explain further, in the power-distributing differential gear device 6, the input shaft 3 is drive-coupled to the carrier 6b, which is intermediate in order of rotational speed. In addition, the rotor 11a of the first dynamo electric machine 11 is drive-coupled to the sun gear 6a, which is on one side in order of rotational speed, and the distribution output member 23 is integratedly formed with the ring gear 6c, which is on another side in order of rotational speed. Thus, the positive torque of the internal combustion engine 2 is transmitted through the input shaft 3 to the carrier 6b, which is intermediate in order of rotational speed, and the negative torque output by the first dynamo electric machine 11 is transmitted through the first rotor shaft 21 to the sun gear 6a, which is on one side in order of rotational speed. In this state, the negative torque of the first dynamo electric machine 11 functions to receive the reaction force of the torque of the internal combustion engine 2, and the torque of the internal combustion engine 2 that is transmitted through the input shaft 3 to the carrier 6b is distributed to the first dynamo electric machine 11 and the distribution output member 23. More specifically, a portion of the torque of the internal combustion engine 2 transmitted through the input shaft 3 to the carrier 6b is distributed to the first dynamo electric machine 11, and a portion of the remaining torque of the internal combustion engine 2 (that is, torque dampened with respect to the torque of the internal combustion engine 2) is transmitted through the ring gear 6c to the distribution output member 23.

The distribution output member 23 is a cylindrical member that is provided so as to surround the radial outer side of the power-distributing differential gear device 6. On an inner circumferential face of the distribution output member 23, the ring gear 6c of the power-distributing differential gear device 6 is integratedly formed with the distribution output member 23. On an outer circumferential face of the distribution output member 23, a distribution output gear 24 is integratedly formed with the distribution output member 23. That is, the ring gear 6c of the power-distributing differential gear device 6 and the distribution output gear 24 are integratedly formed on the inner and outer circumferential faces of the distribution output member 23. Thus, torque transmitted to the distribution output member 23 through the ring gear 6c of the power-distributing differential gear device 6 can be output to the wheel 5 side through the distribution output gear 24.

The counter gear mechanism 7 reverses the rotation direction of the distribution output gear 24, and transmits the torque output from the distribution output gear 24 to the wheel 5 side. The counter gear mechanism 7 is configured with a first gear 7a, a second gear 7b, a third gear 7c, and a counter shaft 7d. The first gear 7a meshes with the distribution output gear 24. The third gear 7c meshes with the output gear 20 of the second dynamo electric machine. The second gear 7b meshes with a differential input gear 8a provided in the output differential gear device 8. Accordingly, the counter gear mechanism 7 reverses the rotation direction of the distribution output gear 24 and the output gear 20 of the second dynamo electric machine, and transmits the torque transmitted to the distribution output gear 24 and the torque of the second dynamo electric machine 12 to the output differential gear device 8.

The output differential gear device 8 has the differential input gear 8a, and distributes and transmits the torque transmitted to the differential input gear 8a to a plurality of wheels 5. In the present example, the output differential gear device 8 is a differential gear mechanism that uses a plurality of mutually meshing bevel gears. The output differential gear device 8 distributes the torque transmitted to the differential input gear 8a through the second gear 7b of the counter gear mechanism 7, and transmits such torque to the two left and right wheels 5 through the output shaft 4. Thus, during forward travel, the drive system 1 rotates the wheel 5 in the same direction as the rotation direction of the input shaft 3 (internal combustion engine 2), and transmits torque in the same direction as the input shaft 3 (internal combustion engine 2) and the second dynamo electric machine 12 to the wheel 5 to run the vehicle.

Figure 3:
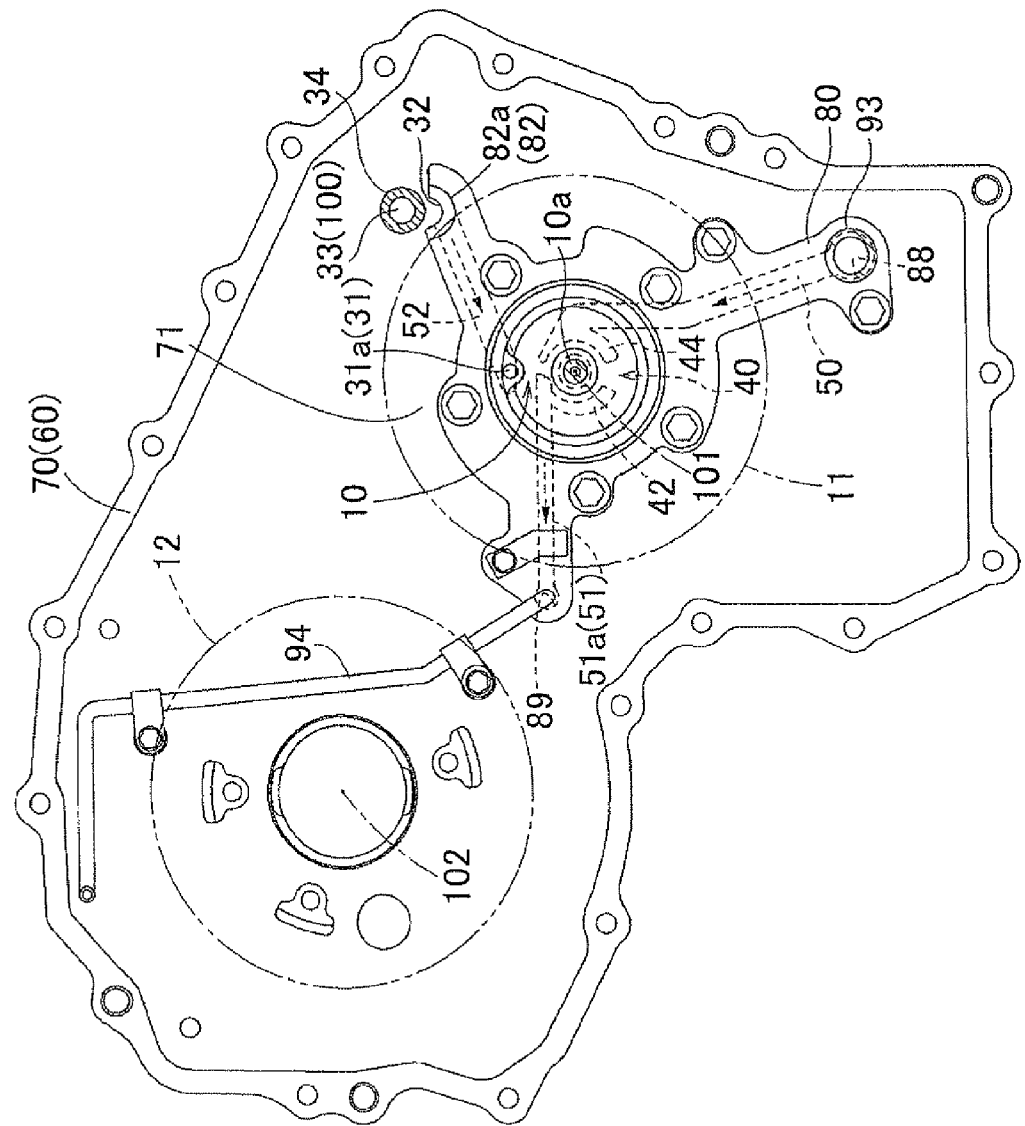
FIG. 3 is a cross-sectional view that slices the vehicle drive system according to the embodiment of the present invention in a direction perpendicular to the axial direction.

Note that the drive system 1 according to the present embodiment has a four-shaft configuration that includes the first shaft 101 on which the input shaft 3, the power-distributing differential gear device 6, and the first dynamo electric machine 11 are disposed; a second shaft 102 on which the second dynamo electric machine 12 is disposed; a third shaft on which the output differential gear device 8 is disposed; and a fourth shaft on which the counter gear mechanism 7 is disposed. The first shaft 101, the second shaft 102, the third shaft, and the fourth shaft are disposed parallel to one another. FIG. 3 shows only the first shaft 101 and the second shaft 102 among the four shafts.

The oil pump 10 is a mechanical pump that operates based on the rotation of the input shaft 3. In the present example, the oil pump 10 is configured so as to generate a required hydraulic pressure for both lubricating and cooling members that constitute the drive system 1. The oil pump 10 is driven by a pump drive shaft 10a that rotates together with the input shaft 3. Specifically, the oil pump 10 is driven by the torque of the internal combustion engine 2.

As shown in FIG. 2, the pump drive shaft 10a is coaxially disposed with the first rotor shaft 21. More specifically, the radial inner side of the first rotor shaft 21 is shaped as a hollow cylinder, and the pump drive shaft 10a is disposed on the radial inner side of the first rotor shaft 21 in a manner that allows the pump drive shaft 10a to rotate relative to the first rotor shaft 21. A shaft-center oil passage 51b is provided inside the pump drive shaft 10a. As will be described in detail later, oil discharged from the oil pump 10 is supplied from the radial inner side through the shaft-center oil passage 51b to the power-distributing differential gear device 6 to lubricate the power-distributing differential gear device 6. Note that the flow of oil is conceptually shown by solid arrows in FIG. 2. The flow of oil is similarly shown in FIGS. 5 to 8 as well. However, the flow of oil is conceptually shown by dashed arrows in FIG. 3.

The drive system 1 according to the present embodiment is configured capable of selecting between a hybrid running mode in which the vehicle runs using the output torque of the internal combustion engine 2 and both the dynamo electric machines 11, 12, and the electric (EV) running mode in which the internal combustion engine 2 is stopped and the torque of the second dynamo electric machine 12 is transmitted to the output shaft 4 to drive the wheel 5. In the hybrid running mode, as described above, the torque of the internal combustion engine 2 is distributed by the power-distributing differential gear device 6 to the first dynamo electric machine 11 and the distribution output member 23. In the EV running mode, the internal combustion engine 2 is stopped and the rotational speed of the output shaft 2a of the internal combustion engine also becomes zero due to the internal friction force of the internal combustion engine 2. Specifically, in the EV running mode, the rotational speed of the input shaft 3 is zero. Further, in the EV running mode, the first dynamo electric machine 11 is controlled so as to have zero torque, and the first rotor shaft 21 that supports the rotor Ha of the first dynamo electric machine 11 can freely rotate. It should be noted, however, because the first rotor shaft 21 is radially supported by the bearing 9 with respect to the case 60 as described above, oil for lubrication (an example of a lubricating-cooling fluid) must be supplied to the bearing 9 in the EV running mode as well.

Further note that, because the rotational speed of the input 3 is zero in the EV running mode as described above, the oil pump 10 that operates based on the rotation of the input shaft 3 does not operate. Hence, to enable oil circulation in the EV running mode as well, a configuration is provided in the present embodiment that utilizes the rotation of the output shaft 4 which always rotates during vehicle travel regardless of the running mode. More specifically, the drive system 1 according to the present embodiment includes an oil introduction mechanism 100 that uses the rotation of the output shaft 4 to rake up oil accumulated at the bottom portion of the case 60, and utilizes the force of gravity to supply the raked up oil to regions that require oil (in the present example, the bearing 9, the first dynamo electric machine 11, and the like). In the present example, the oil introduction mechanism 100 is configured so as to rake up oil accumulated at the bottom portion of the case 60 by the rotation of the differential input gear 8a (also referred to as a differential ring gear) drive-coupled to the output shaft 4. Oil and the oil introduction mechanism 100 in the present embodiment respectively correspond to a "lubricating-cooling fluid" and a "lubricating-cooling fluid introduction mechanism" of the present invention.

2. Configuration of Case

Next, the configuration of the ease 60 provided in the drive system 1 according to the present embodiment will be described with reference to FIGS. 2 to 5. The case 60 accommodates therein the input shaft 3, the first dynamo electric machine 11, the second dynamo electric machine 12, the power-distributing differential gear device 6, the distribution output member 23, the counter gear mechanism 7, and the output differential gear device 8. The case 60 includes a main body portion 61 that has an opening portion 62, and a cover portion 70 that is attached to the opening portion 62. In the present example, the cover portion 70 is fastened and fixed to the main body portion 61 from the one axial side, with a fluid-tight state achieved between the main body portion 61 and the cover portion 70. In addition, a pump cover 80 is fastened and fixed to the cover portion 70 from the one axial side. The main body portion 61, the cover portion 70, and the pump cover 80 may be cast components, for example. If these members are cast components, recessed portions for forming oil passages are preferably formed by casting. The configurations of the main body portion 61, the cover portion 70, and the pump cover 80 provided in the case 60 will be described below in that order. Note that the configurations of oil passages formed within the ease 60 will be described in a third section. The pump cover 80 in the present embodiment corresponds to a "flow passage formation member" of the present invention.

2-1. Configuration of Main Body Portion

The main body portion 61 has a circumferential wall portion with a cylindrical shape, and the circumferential wall portion is configured so as to cover the first dynamo electric machine 11 and the second dynamo electric machine 12 from the radial outer side. An end portion of the main body portion 61 on the other axial end side is configured as a coupling-fixing portion that couples and fixes to the internal combustion engine 2, and can transmit the torque of the internal combustion engine 2 to inside the case 60. An end portion of the main body portion 61 on the one axial side is formed with the opening portion 62. Specifically, the opening portion 62 is located on the end portion that is opposite the coupling-fixing portion in the axial direction with respect to an axial center portion of the case 60.

Figure 5:
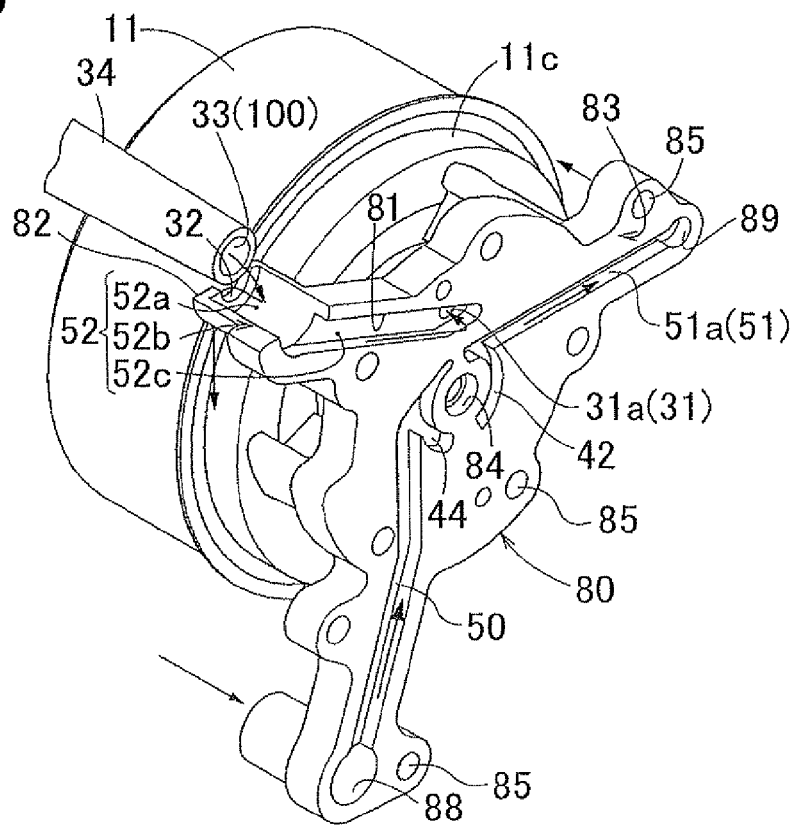
FIG. 5 is a perspective view of a pump cover and a first dynamo electric machine according to the embodiment of the present invention.

Note that, as described above, the present embodiment is configured such that the rotation of the output shaft 4, and more specifically, the rotation of the differential input gear 8a drive-coupled to the output shaft 4, causes oil accumulated at the bottom portion of the case 60 to be raked up. An upper portion of the main body portion 61 includes an oil accumulation portion 91 (see FIG. 2) for storing the raked up oil. The main body 61 also includes a communication oil passage 95 that communicates with the oil accumulation portion 91, and an oil supply hole 33 for supplying oil to a bearing supply oil passage 52 (described in detail later) is formed on a side (in the present example, the end portion on the one axial side) of the communication oil passage 95 that is opposite the oil accumulation portion 91 in the axial direction. Specifically, in the present embodiment, the oil introduction mechanism 100 is configured to include the differential input gear 8a, the oil accumulation portion 91, the communication oil passage 95, and the oil supply hole 33. Thus, regardless of the vehicle running mode, that is, even in the EV running mode, a configuration is achieved in which the oil introduction mechanism 100 can supply oil to the bearing supply oil passage 52. Note that in the present example, as shown in FIGS. 2 and 5, the main body portion 61 includes a cylindrical member 34 whose axial center extends in the axial direction, and the communication oil passage 95 is formed by an inner circumferential face of the cylindrical member 34. In addition, the oil supply hole 33 is formed by an opening of the cylindrical member 34 on the one axial side. In the present embodiment, the oil supply hole 33 corresponds to a "lubricating-cooling fluid supply portion" of the present invention, and the bearing supply oil passage 52 corresponds to a "supply flow passage" of the present invention.

2-2. Configuration of Cover Portion

The cover portion 70 is configured in the present example so as to cover and close off the whole opening portion 62 of the main body portion 61, and defines in the axial direction an internal space and an external space of the case 60. Specifically, the cover portion 70 is disposed in a boundary area between the internal space and the external space of the case 60. As shown in FIGS. 2 and 3, the pump cover 80 is attached to the cover portion 70 from the other axial side. Note that FIG. 3 is a cross-sectional view that slices the drive system 1 in the radial direction at a location where the main body portion 61 and the cover portion 70 are connected, but only a portion of the structural elements are shown for the purposes of this description. For example, the bearing 9 and the first rotor shaft 21 are not shown in FIG. 3. Also, in FIG. 3, an oil passage formed by a joined portion 72 between the cover portion 70 and the pump cover 80 is shown by a dashed line, and the outer diameters (outer circumferential faces) of the first dynamo electric machine 11 and the second dynamo electric machine 12 are shown by double-dashed lines.

The cover portion 70 includes a wall portion 71 overlapping a dynamo electric machine (simply referred to as an "overlapping wall portion 71" below). The overlapping wall portion 71 is a wall portion that is disposed on either axial side (in the present example, the one axial side) with respect to the first dynamo electric machine 11, and has a section that overlaps with the first dynamo electric machine 11 as viewed from the axial direction. In the present example, the overlapping wall portion 71 is integratedly formed with the cover portion 70 as a portion of the cover portion 70. The overlapping wall portion 71 includes an extension face that extends in a direction that intersects the axial direction on a side to which the pump cover 80 is attached (the other axial side), and the pump cover 80 is attached to the extension face. Note that, in the present example, the extension face is a plane that extends in a direction perpendicular to the axial direction. The overlapping wall portion 71 includes the bearing supply oil passage 52 for supplying oil to the bearing 9 that supports the first rotor shaft 21.

Figure 4:
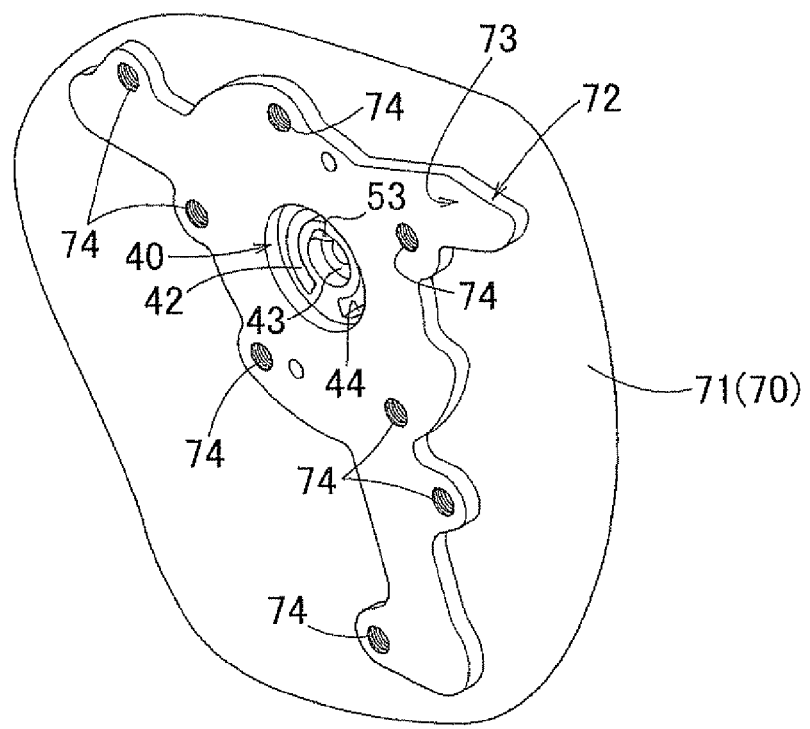
FIG. 4 is a perspective view of a joined section of a cover portion according to the embodiment of the present invention.

As shown in FIG. 4, a mating face of the overlapping wall portion 71 is formed with a recessed portion for forming the oil pump 10 and a plurality of fastening holes 74 for attaching the pump cover 80. Here, the mating face of the overlapping wall portion 71 refers to a plane that is covered by the pump cover 80 in a state where the pump cover 80 is attached to the cover portion 70 (simply referred to as a "pump cover attached state" below). In other words, the mating face of the overlapping wall portion 71 is a flat plane that includes a contact face 73 (joined face) that contacts the pump cover 80 at the joined portion 72 in the pump cover attached state, and refers to a flat plane whose peripheral border is generally defined by the joined portion 72 and the contour of the pump cover 80 as viewed from a direction perpendicular to the flat plane. Specifically, the mating face of the overlapping wall portion 71 is configured by the contact face 73 and a virtual plane at locations where recessed portions and holes are formed. Note that a "recessed portion" related to the mating face of the overlapping wall portion 71 represents a section located on a side (in the present example, the one axial side) away from the pump cover 80 with respect to the contact face 73 in the pump cover attached state.

The overlapping wall portion 71 is formed with a recessed portion for defining and forming a pump chamber 40 of the oil pump 10 (referred to as a "pump-chamber-forming recessed portion" below) that has a shape with a circular cross section as viewed from the axial direction. In addition, a bottom face (a face on the one axial side) of the pump-chamber-forming recessed portion is formed with recessed portions for forming an intake chamber 44, a discharge chamber 42, and a shaft end chamber 43, as well as a hole for forming a communication oil passage 53.

Note that the contact face 73 of the overlapping wall portion 71 has a contour as shown in FIG. 4, and is a level plane that projects toward the other axial side with respect to another adjacent section (a section other than the joined portion 72) of the cover portion 70 on the radial outer side.

2-3. Configuration of Pump Cover

As shown in FIG. 2, the pump cover 80 is accommodated in a case inner space surrounded by the main body portion 61 and the cover portion 70 of the case 60, and attached to a case inner face of the cover portion 70 that constitutes an inner face of the case 60. The pump cover 80 is attached to a face on the first dynamo electric machine 11 side (the other axial side) in the axial direction of the overlapping wall portion 71, as shown in FIG. 2. Note that, as shown in FIG. 3, the pump cover 80 is fastened and fixed to the cover portion 70 by a fastening bolt in the present example.

As shown in FIG. 5, a mating face of the pump cover 80 is formed with a plurality of recessed portions for forming oil passages, an insertion hole 84 for accommodating the pump drive shaft 10a, and a plurality of insertion holes 85 for accommodating fastening bolts. Here, the mating face of the pump cover 80 refers to a face on a side that contacts the cover portion 70 (overlapping wall portion 71) in the pump cover attached state. In other words, the mating face of the pump cover 80 is a flat plane that includes a contact face 83 (joined face) that contacts the cover portion 70 at the joined portion 72 in the pump cover attached state, and refers to a flat plane whose peripheral border is generally defined by the contour of the pump cover 80 as viewed from a direction perpendicular to the flat plane. Specifically, the mating face of the pump cover 80 is configured by the contact face 83 and a virtual plane at locations where recessed portions and holes are formed. Note that a "recessed portion" related to the mating face of the pump cover 80 represents a section located on a side (in the present example, the other axial side) away from the cover portion 70 with respect to the contact face 83 in the pump cover attached state. Also, in the present example, the contact face 83 of the pump cover 80 is a level face similar to the contact face 73 of the cover portion 70.

The pump cover 80 is formed with recessed portions for forming an intake oil passage 50, a radial discharge oil passage 51a, the intake chamber 44, and the discharge chamber 42. In addition, the pump cover 80 is formed such that an oil-passage-forming recessed groove 81, which is a recessed portion for forming the bearing supply oil passage 52, retreats (recesses) toward the other axial side (first dynamo electric machine 11 side) with respect to the contact face 83 of the pump cover 80. Note that in the present example, a cross section perpendicular to the extending direction of the oil-passage-forming recessed groove 81 has a rectangular shape, but the shape of the cross section may be changed as appropriate. For example, the cross section may have a semicircular, triangular, or other shape. A communication hole 31a for supplying oil flowing through the bearing supply oil passage 52 to the bearing 9 is formed on an end portion on a side opposite a channel-shaped member 82 described later in the extending direction of the oil-passage-forming recessed groove 81. In the present embodiment, the oil-passage-forming recessed groove 81 corresponds to a "recessed groove" of the present invention, and the communication hole 31a corresponds to a "throttle portion" of the present invention.

The cover portion 70 (overlapping wall portion 71) and the pump cover 80 are fastened and fixed (joined) in a manner where the contact face 73 (a level plane in the present example) that is provided on the mating face of the overlapping wall portion 71 is in contact with the contact face 83 (a level plane in the present example) that is provided on the mating face of the pump cover 80. Thus, chambers that constitute oil passages and the oil pump 10 are formed by the recessed portions formed on the mating face of the overlapping wall portion 71 and the recessed portions formed on the mating face of the pump cover 80. Specifically, in the present example, the oil pump 10 is formed at the joined portion 72 between the cover portion 70 (overlapping wall portion 71) and the pump cover 80. It should be noted that by adopting such a configuration, constant fluid-tightness can be achieved without using a seal member. In addition, the joined portion 72 formed with the pump chamber 40 of the oil pump 10 and oil passages is located in the case inner space. Therefore, even if oil were to leak outside the pump chamber 40 or an oil passage, the oil merely drips into the case inner space and such leakage can be tolerated.

Note that in the present example, as shown in FIG. 2, the oil pump 10 is an internal gear pump that includes an inner rotor 10b and an outer rotor inside the pump chamber 40. As described above, the oil pump 10 operates based on the rotation of the input shaft 3, and the inner rotor 10b is fixed to the pump drive shaft 10a that rotates together with the input shaft 3 in the present example. As shown in FIGS. 2, 3, and 5, the oil pump 10 is configured so as to generate a hydraulic pressure by suctioning oil from the intake chamber 44 into the pump chamber 40 through an intake port, and discharge oil to the discharge chamber 42 through a discharge port. The intake port is an opening formed on an axial end portion of the pump chamber 40 that communicates with the intake chamber 44, and functions to communicate the pump chamber 40 with the intake chamber 44. The discharge port is an opening formed on an axial end portion of the pump chamber 40 that communicates with the discharge chamber 42, and functions to communicate the pump chamber 40 with the discharge chamber 42. It should be noted that the configuration of the oil pump 10 is not limited to this example, and an external gear pump, a vane pump, or the like are other types of pumps that may also be used.

The pump cover 80 further includes the channel-shaped member 82 that opens upward to collect oil falling from the oil supply hole 33. As shown in FIGS. 2 and 5, in the present example, the channel-shaped member 82 is formed such that an extending direction thereof follows the axial direction, and an end portion thereof on the other axial side is disposed so as to be located below the oil supply hole 33. Thus, oil supplied from the oil accumulation portion 91 to the oil supply hole 33 through the communication oil passage 95 falls from the oil supply hole 33 by the force of gravity, and oil can be suitably supplied to the channel-shaped member 82. Note that in the present embodiment, as shown in FIGS. 2, 3, and 5, the channel-shaped member 82 and the cylindrical member 34 that includes therein the communication oil passage 95 are disposed separate from each other in the up-down direction so as to avoid mutual contact. In addition, by configuring the pump cover 80 to include the channel-shaped member 82 described above, the channel-shaped member 82 can be made a part of the pump cover 80, thus suppressing an increase in the number of parts caused by providing the channel-shaped member 82.

3. Configuration of Oil Passages

Next, the configuration of the oil passages provided in the drive system 1 according to the present embodiment will be described. As shown in FIGS. 2, 3, and 5, the drive system 1 includes the bearing supply oil passage 52 through which oil to be supplied to the bearing 9 flows; the intake oil passage 50 through which oil to be suctioned by the oil pump 10 flows; and a discharge oil passage 51 through which oil discharged by the oil pump 10 flows. The configurations of the bearing supply oil passage 52, the intake oil passage 50, and the discharge oil passage 51 provided in the drive system 1 will be described below in that order.

3-1. Configuration of Bearing Supply Oil Passage

The bearing supply oil passage 52 is included in the overlapping wall portion 71, as described above. The bearing supply oil passage 52 includes a first supply portion 31 that is a portion supplying oil to the bearing 9 that supports the rotor 11a of the first dynamo electric machine 11, and a second supply portion 32 that is a portion supplying oil to the first dynamo electric machine 11. Note that the second supply portion 32 is formed higher than the first supply portion 31.

In the present embodiment, the bearing supply oil passage 52 includes an open flow passage portion 52a that has an opening portion 52b, and a closed flow passage portion 52c whose periphery is closed. As described above, the pump cover 80 includes the channel-shaped member 82, and a recessed face is formed on an upper portion of the channel-shaped member 82. This recessed face is formed as part of a cylindrical face, and the recessed face will be referred to as an "inner circumferential face" below. The open flow passage portion 52a is formed by the inner circumferential face of the channel-shaped member 82. Specifically, the inner circumferential face of the channel-shaped member 82 defines the open flow passage portion 52a in the radial direction of the inner circumferential face (channel-shaped member 82). Further, in the present embodiment, the opening portion 52b opens upward, and the oil supply hole 33 that supplies oil to the bearing supply oil passage 52 is provided above the opening portion 52b. Thus, oil can be suitably supplied to the bearing supply oil passage 52 with a simple configuration in which oil drips (falls) from the oil supply hole 33 by the force of gravity.

Note that, as described above, the channel-shaped member 82 is disposed such that an extending direction thereof follows the axial direction, and oil is supplied to the channel-shaped member 82 from the other axial side through the oil supply hole 33 as shown in FIG. 2. In addition, as shown in FIGS. 2 and 5, an end portion of the channel-shaped member 82 on the other axial side is formed with a flow restriction portion 82a that extends from the inner circumferential face of the channel-shaped member 82 toward the radial inner side, in order to restrict the flow of oil to the other axial side when the oil level of the open flow passage portion 52a is at or below a predetermined level. As shown in FIG. 3, the flow restriction portion 82a is formed into a circular arc shape with a constant width in the radial direction of the channel-shaped member 82 as viewed from the axial direction. Accordingly, a flow of oil basically from the other axial side to the one axial side is formed in the open flow passage portion 52a. An end portion of the open flow passage portion 52a on the one axial side is connected to the closed flow passage portion 52c. Therefore, oil supplied from the oil supply hole 33 to the open flow passage portion 52a (channel-shaped member 82) is supplied from the end portion of the open flow passage portion 52a on the one axial side to the closed flow passage portion 52c. Thus, in the present example, the closed flow passage portion 52c communicates with the open flow passage portion 52a on the upstream side of the oil flow direction.

The closed flow passage portion 52c is formed at the joined portion 72 between the cover portion 70 (overlapping wall portion 71) and the pump cover 80 by the oil-passage-forming recessed groove 81 provided on the mating face of the pump cover 80, and the mating face (contact face 73) of the overlapping wall portion 71. More specifically, in the pump cover attached state, the closed flow passage portion 52c is formed along the mating faces by closing off the opening portion on the cover portion 70 side (one axial side) of the oil-passage-forming recessed groove 80 with the contact face 73 of the overlapping wall portion 71. Note that, as described above, the cover portion 70 (overlapping wall portion 71) and the pump cover 80 are joined such that level contact surfaces thereof contact each other, whereby at least constant fluid-tightness can be achieved. Thus, the closed flow passage portion 52c whose periphery is closed can be formed with a simple configuration. In this manner, the bearing supply oil passage 52 in the present embodiment has a flow passage (the closed flow passage portion 52c) formed by a recessed groove (the oil-passage-forming recessed groove 81) that is provided on at least one of the mating face of the overlapping wall portion 71 and the mating face of the pump cover 80 (in the present example, on the mating face of the pump cover 80) at the joined portion 72 between the pump cover 80 and the overlapping wall portion 71.

The closed flow passage portion 52c is formed so as to communicate with the first supply portion 31 on the downstream side of the oil flow direction. Specifically, the closed flow passage portion 52c communicates with the first supply portion 31 and the open flow passage portion 52a. Thus, as shown in FIG. 2, oil supplied from the open flow passage portion 52a to the closed flow passage portion 52c can be supplied to the bearing 9 through the first supply portion 31. Note that, as shown in FIG. 2, a portion of the oil supplied to the first supply portion 31 is supplied to the axial oil passage 58 formed inside the first rotor shaft 21. In the present specification, "supplying oil to the bearing 9 through the first supply portion 31" and any synonymous wording is used as an idea that includes supplying oil to the axial oil passage 58 through the first supply portion 31.

In the present embodiment, the closed flow passage portion 52c is at least formed so as to extend downward from a location of communication with the open flow passage portion 52a toward a location of communication with the first supply portion 31. More specifically, as shown in FIGS. 3 and 5, the closed flow passage portion 52c is linearly formed such that an extending direction thereof is a direction that intersects both the vertical direction and the horizontal direction. By thus forming the closed flow passage portion 52c so as to at least extend downward in the oil flow direction, oil supplied from the open flow passage portion 52a to the closed flow passage portion 52c can be suitably supplied to the first supply portion 31 by the force of gravity.

In order to suppress excessive drag loss in the bearing 9, it is preferably possible to suppress an oversupply of oil to the bearing 9. In view of this point, the first supply portion 31 that is a portion supplying oil to the bearing 9 includes the communication hole 31a. The communication hole 31a is a hole that is made in the axial direction in the present example. The opening cross-sectional area (flow passage cross-sectional area) of the communication hole 31a is set smaller than the flow passage cross-sectional area of the first supply portion 31 (closed flow passage portion 52c), which is upstream of the communication hole 31a in the oil flow direction. Specifically, the communication hole 31a formed in the first supply portion 31 has a small flow passage cross-sectional area with respect to the flow passage cross-sectional area on the upstream side (closed flow passage portion 52c side) of the oil flow direction, and functions as a throttle portion that restricts the flow of oil. In other words, a section of the first supply portion 31 that includes the communication hole 31 is formed with a throttle portion whose downstream-side flow passage cross-sectional area in the oil flow direction is small with respect to the upstream-side flow passage cross-sectional area in the flow direction. Accordingly, the amount of oil flowing through the first supply portion 31 is restricted by the communication hole 31a. Thus, when there is a large amount of oil supplied to the bearing supply oil passage 52, oil is suppressed from being supplied in excess to the bearing 9. Note that a maximum value of the amount of oil per unit time that can pass through the communication hole 31a (referred to as a "unit flow tolerance" below) is determined based on the inner diameter of the communication hole 31a. Therefore, the amount of oil supplied to the bearing 9 (maximum supply amount) can be adjusted by changing the inner diameter.

In addition, the open flow passage portion 52a is formed with the second supply portion 32 as shown in FIGS. 2 and 5. More specifically, the second supply portion 32 is a lowermost portion of the opening portion 52b provided in the open flow passage portion 52a. Here, the opening portion 52b is a section that determines a boundary area (excluding the boundary area with the closed flow passage portion 52c) between an internal space of the open flow passage portion 52a and an external space of the open flow passage portion 52a in a member that forms the open flow passage portion 52a (in the present example, the channel-shaped member 82). In other words, the opening portion 52b is determined by a plane that faces the opening direction (upward in the present example) of the opening portion 52b (a plane having a component whose normal direction is the opening direction) in a wall portion that defines the open flow passage portion 52a. Accordingly, in the present embodiment, an upper face of a wall portion that defines the open flow passage portion 52a in the channel-shaped member 82 is the opening portion 52b as shown in FIG. 5. In the example shown in FIG. 5, the lowermost portion of the opening portion 52b is a lowermost portion of the upper face of the flow restriction portion 82a provided on the end portion of the channel-shaped member 82 on the other axial side, and that lowermost portion is the second supply portion 32.

Note that, as described above, the channel-shaped member 82 and the cylindrical member 34 that includes therein the communication oil passage 95 are disposed separate from each other in the up-down direction so as to avoid mutual contact. Therefore, an upper portion of the second supply portion 32 has a clearance as shown in FIGS. 2, 3, and 5. As a consequence, oil is discharged from the second supply portion 32 to outside the open flow passage portion 52a when the oil level of the open flow passage portion 52a exceeds a predetermined level. Further note that the second supply portion 32 is located above the coil end portion 11c provided in the first dynamo electric machine 11. Thus, oil discharged outside the open flow passage portion 52a through the second supply portion 32 falls by the force of gravity and is supplied to the coil end portion 11c.

Both the bearing 9 that is supplied with oil and the bearing supply oil passage 52 that is an oil passage for supplying oil to the bearing 9 are provided in the overlapping wall portion 71. Thus, the bearing supply oil passage 52 can have a small and simple configuration especially in the vicinity of the first supply portion 31. To be more precise, the bearing 9 is provided in the pump cover 80 that is fixed to the overlapping wall portion 71; however, in the present application, a configuration in which the bearing 9 is thus provided in a member fixed to the overlapping wall portion 71 corresponds to being "provided in the overlapping wall portion 71". Also, as shown in FIG. 2, the overlapping wall portion 71 is disposed adjacent to the first dynamo electric machine 11 on the one axial side. Therefore, the bearing supply oil passage 52 can also have a small and simple configuration in the vicinity of the second supply portion 32. Accordingly, the bearing supply oil passage 52 can have small and simple configurations in the vicinity of both the first supply portion 31 and the second supply portion 32, which suppresses an increase in the size of the case 60 and an increase in manufacturing costs, and enables a suitable supply of oil to the bearing 9 and the first dynamo electric machine 11.

Providing the configuration described above makes it possible to achieve two oil supply states depending on the amount of oil supplied from the oil supply hole 33 to the bearing supply oil passage 52 (in the present example, the open flow passage portion 52a). More specifically, it is possible to have a configuration capable of achieving both a state in which oil is mainly supplied to the bearing 9 through the first supply portion 31, and a state in which oil is supplied to the bearing 9 through the first supply portion 31 and also supplied to the first dynamo electric machine 11 through the second supply portion 32. This point will be described below with reference to FIG. 6.

Figure 6A:
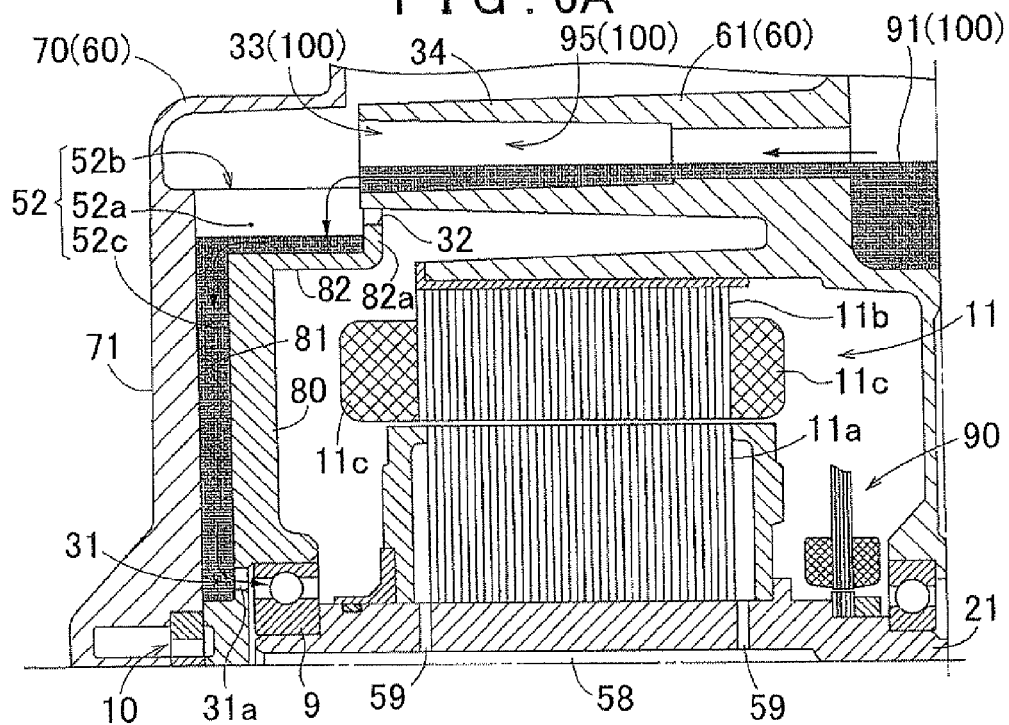
FIGS. 6A and 6B are views that schematically show a state of oil supply in a first supply mode and a second supply mode, respectively, according to the embodiment of the present invention.

FIG. 6A is a view that schematically shows an oil supply state (referred to as a "first supply state" below) when an amount of oil supplied per unit time to the bearing supply oil passage 52 (referred to as a "unit supply amount" below) is smaller than the unit flow tolerance. In the first supply state, the oil level of the bearing supply oil passage 52 is at or below the height of the second supply portion 32 as shown in FIG. 6A, and oil supplied from the oil supply hole 33 to the bearing supply oil passage 52 is mainly supplied to the bearing 9 through the first supply portion 31. Thus, in the first supply state, lubrication of the bearing 9 can be reliably performed.

Note that because the periphery of the closed flow passage portion 52c is closed, the closed flow passage portion 52c can temporarily store oil and the oil level of the bearing supply oil passage 52 shifts in the up-down direction in accordance with increases and decreases in the unit supply amount.

Figure 6B:
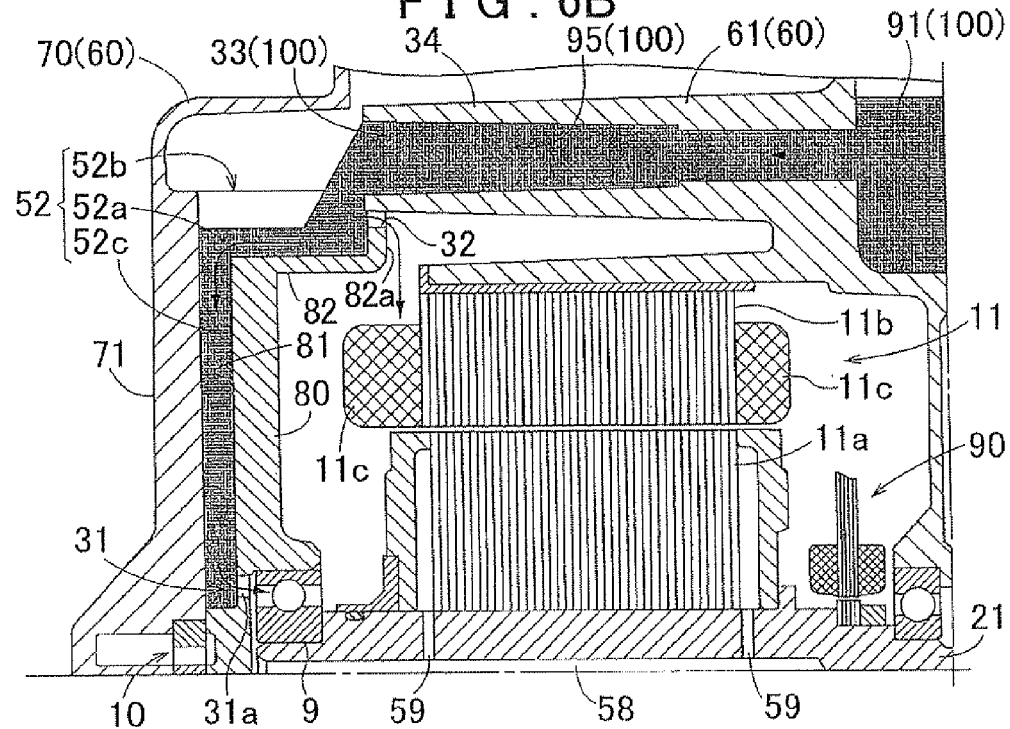

FIG. 6B is a view that schematically shows an oil supply state (referred to as a "second supply state" below) when the unit supply amount is larger than the unit flow tolerance. In the second supply state, all the oil supplied from the oil supply hole 33 cannot be discharged from the bearing supply oil passage 52 through the first supply portion 31. Therefore, the oil level of the bearing supply oil passage 52 becomes higher than the oil level in the first supply state. As a consequence, an amount of oil that depends on the difference between the unit supply amount and the unit flow tolerance is discharged from the open flow passage portion 52a to outside the open flow passage portion 52a. Note that, as described above, the open flow passage portion 52a is provided with the second supply portion 32 at the lowermost portion of the opening portion 52b. Therefore, oil discharged from the open flow passage portion 52a to outside the open flow passage portion 52a is preferentially discharged from the second supply portion 32. Specifically, the second supply state is a state in which oil is discharged from the first supply portion 31 and oil is also discharged from the second supply portion 32. Further note that the second supply portion 32 is located above the coil end portion 11c provided in the first dynamo electric machine 11. Thus, oil discharged from the second supply portion 32 is supplied to the coil end portion 11c, thereby cooling the stator 11b of the first dynamo electric machine 11. Specifically, in the second supply state, in addition to lubrication of the bearing 9, cooling of the first dynamo electric machine 11 can also be reliably performed.

As described above, in the present embodiment, changes in the oil level of the bearing supply oil passage 52 can be utilized to achieve a state in which oil is mainly supplied to the bearing 9 through the first supply portion 31, and a state in which oil is supplied to the bearing 9 through the first supply portion 31 and also supplied to the first dynamo electric machine 11 through the second supply portion 32. To achieve a configuration that actively supplies oil to the first dynamo electric machine 11 through the second supply portion 32 in the second supply state where the oil level of the bearing supply oil passage 52 is high, the second supply portion 32 is provided higher than the first supply portion 31.

As described above, the present embodiment is configured such that oil raked up by the rotation of the output shaft 4 is supplied to the bearing supply oil passage 52. Thus, the amount of oil supplied to the bearing supply oil passage 52 increases with an increase in vehicle speed. Specifically, the first supply state occurs at low vehicle speeds, and the second supply state occurs at high vehicle speeds. In the second supply state, the difference between the unit supply amount and the unit flow tolerance grows larger as the vehicle speed increases. Therefore, the amount of oil supplied to the first dynamo electric machine 11 through the second supply portion 32 also increases. Note that the amount of heat generated by the first dynamo electric machine 11 generally increases with an increase in vehicle speed. Accordingly, in the present embodiment, oil can be suitably supplied to the first dynamo electric machine 11 that generates more heat with an increase in vehicle speed in order to cool the first dynamo electric machine. In addition, oil can be suitably supplied to the bearing 9 in either of the first supply state and the second supply state. Further, in the second supply state, oil of at least an amount required for lubricating the bearing 9 is supplied to the bearing supply oil passage 52, and oil not supplied to the bearing 9 is supplied to the first dynamo electric machine 11. With such a configuration, energy consumed by the output shaft 4 (differential input gear 8a) raking up oil is kept from being wasted.

3-2. Configuration of Intake Oil Passage

The intake oil passage 50 is an oil passage for guiding oil to the pump chamber 40. In the present embodiment, as shown in FIG. 2, an end of the intake oil passage 50 communicates through an oil passage connection hole 88 with an oil passage within an oil passage pipe 93 that is linked to a strainer 92. The oil pump 10 suctions oil from an oil supply source through the oil passage within the oil passage pipe 93 and the intake oil passage 50. The oil passage connection hole 88 is a hole that is made in the axial direction in the present example.

In the present embodiment, as shown in FIGS. 2, 3, and 5, the intake oil passage 50 is formed by a recessed groove provided on the mating face of the pump cover 80 and the mating face (contact face 73) of the overlapping wall portion 71. More specifically, in the pump cover attached state, the intake oil passage 50 is formed along the mating faces by closing off the opening portion on the cover portion 70 side of the recessed groove with the contact face 73 of the overlapping wall portion 71. The intake oil passage 50 has one end that communicates with the oil passage connection hole 88, and another end that communicates with the intake chamber 44. Therefore, oil supplied to the oil passage connection hole 88 through the intake oil passage 50 is supplied to the intake chamber 44 that communicates with the intake port.

3-3. Configuration of Discharge Oil Passage

The discharge oil passage 51 is an oil passage for supplying oil discharged by the oil pump 10 to various parts of the drive system 1. In the present embodiment, the radial discharge oil passage 51a and the shaft-center oil passage 51b are provided as the discharge oil passage 51.

As shown in FIGS. 2, 3, and 5, the radial discharge oil passage 51a is formed by a recessed groove provided on the mating face of the pump cover 80 and the mating face (contact face 73) of the overlapping wall portion 71. More specifically, in the pump cover attached state, the radial discharge oil passage 51 a is formed along the mating faces by closing off the opening portion on the cover portion 70 side of the recessed groove with the contact face 73 of the overlapping wall portion 71. The radial discharge oil passage 51a has one end that communicates with the discharge chamber 42 that is in communication with the discharge port, and another end that communicates with an oil passage connection hole 89. Therefore, oil discharged by the oil pump 10 is supplied to the oil passage connection hole 89 through the radial discharge oil passage 51a. The oil passage connection hole 89 is a hole that is made in the axial direction in the present example.

Note that the oil passage connection hole 89 is connected to one end of an oil passage pipe 94. In the present embodiment, as shown in FIG. 3, another end of the oil passage pipe 94 is connected to an oil passage connection hole that is provided higher than the second shaft 102 on which the second dynamo electric machine 12 is disposed. A configuration is thus achieved in which at least a portion of the oil supplied to the oil passage pipe 94 is used for cooling the second dynamo electric machine 12.

As shown in FIG. 2, the shaft-center oil passage 51b is formed inside the pump drive shaft 10a. Oil is supplied from the discharge port to the shaft-center oil passage 51b through the discharge chamber 42, the communication oil passage 53, and the shaft end chamber 43. More specifically, the discharge chamber 42, the communication oil passage 53, and the shaft end chamber 43 are formed in a mutually communicating manner on the case inner face of the cover portion 70

(overlapping wall portion 71), and the shaft end chamber 43 communicates with a shaft end portion 55 that is an end portion of the shaft-center oil passage 51b on the one axial side. Thus, oil can be suitably supplied from the discharge port of the pump chamber 40 to the shaft-center oil passage 51b.

The present embodiment is configured such that oil supplied to the shaft-center oil passage 51b flows toward an end on the other axial side and is supplied from the radial inner side to the power-distributing differential gear device 6 through an oil passage not shown in the drawings. By providing the shaft-center oil passage 51b described above, oil can be suitably supplied from the radial inner side to parts to which it is difficult to supply oil from the radial outer side.

4. Other Embodiments

Other embodiment according to the present invention will now be described. Note that characteristics disclosed in the embodiments below are not limited to those particular embodiments, and may also be applied to other embodiments unless an inconsistency occurs.

Figure 7:
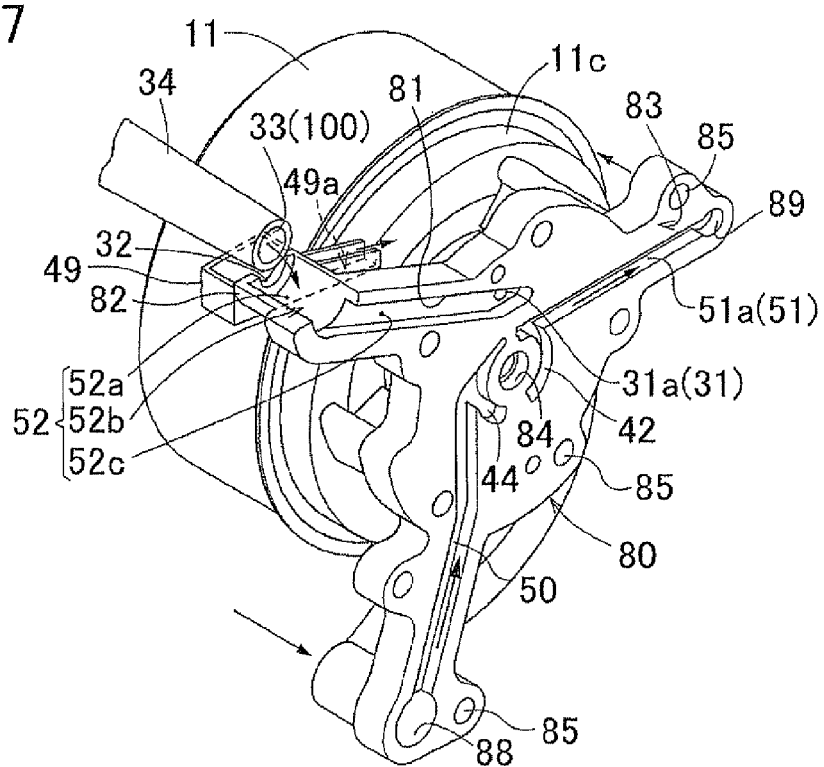
FIG. 7 is a perspective view of the pump cover and the first dynamo electric machine according to another embodiment of the present invention.

(1) In the embodiment described above, as an example, oil discharged from the open flow passage portion 52a through the second supply portion 32 falls by the force of gravity and is supplied to the coil end portion 11c. However, the embodiments of the present invention are not limited to this example. Specifically, in another preferred embodiment of the present invention as shown in FIG. 7 for example, a guidance member 49 is provided that guides oil supplied from the second supply portion 32 to a predetermined location of the first dynamo electric machine 11 to be supplied with oil. The guidance member 49 is configured to include a guidance face 49a that extends from the second supply portion 32 side toward the first dynamo electric machine 11 side downward at an angle with respect to the horizontal direction.

With such a configuration, oil can be easily supplied to a desired location with respect to the first dynamo electric machine 11 (e.g. an uppermost portion or near the uppermost portion of the coil end portion 11c), and the first dynamo electric machine 11 can be more efficiently cooled. In the example shown in FIG. 7, the guidance member 49 is a separate member from the pump cover 80, and the guidance member 49 is fixed to the end portion of the channel-shaped member 82 on the other axial side, which is provided in the pump cover 80. Note that a configuration may be used in which the pump cover 80 and the guidance member 49 are disposed separate from each other in the up-down direction and the horizontal direction, and a configuration may be used in which the guidance member 49 is integratedly formed with the pump cover 80. In addition, the shape of the guidance member 49 may be changed as appropriate. For example, although FIG. 7 illustrates an example in which a wall portion for forming the oil flow on the guidance face 49a is formed so as to project upward from the guidance face 49a, the shape of the wall portion may be changed as appropriate. Also, a section of the guidance member 49 that forms at least the guidance face 49a may have a channel-like shape. Further, although the guidance member 49 has an opening portion that opens upward in the example shown in FIG. 7, the guidance member 49 may be formed such that the top of at least a portion thereof is closed off.

Figure 8:
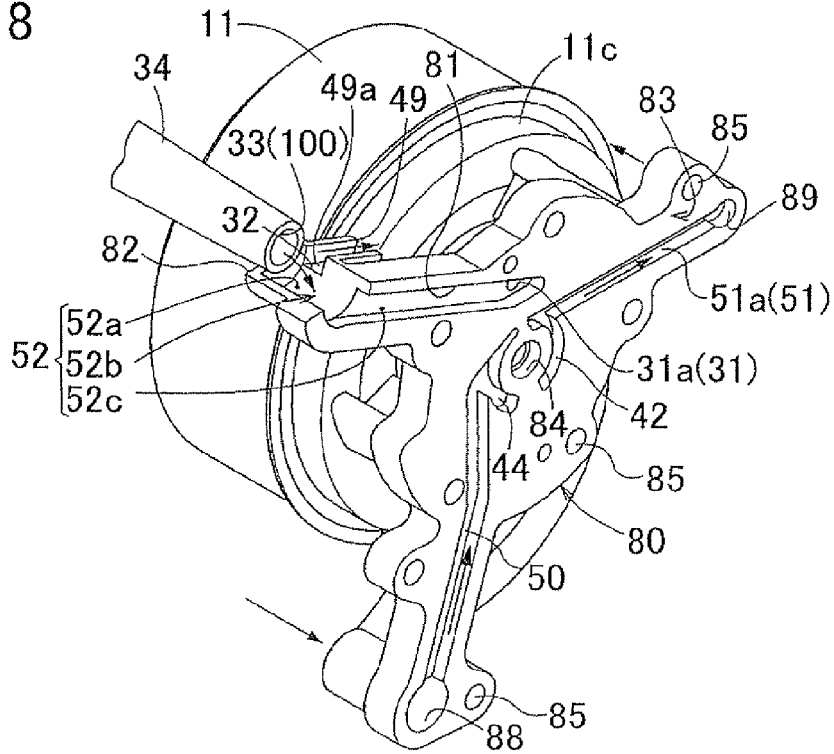
FIG. 8 is a perspective view of the pump cover and the first dynamo electric machine according to yet another embodiment of the present invention.

(2) In the embodiment described above, as an example, the second supply portion 32 is formed on the end portion of the open flow passage portion 52a on the other axial side. However, the embodiments of the present invention are not limited to this example, and the location where the second supply portion 32 is formed may be changed as appropriate. For example, as shown in FIG. 8, a cutout portion that cuts out part of the channel-shaped member 82 for a predetermined axial width along the circumferential direction of the channel-shaped member 82 may be formed, and a bottom face of the cutout portion may serve as the second supply portion 32. It should be noted that although FIG. 8 shows a configuration that includes the guidance member 49 described above, a configuration that does not include the guidance member 49 is also naturally conceivable. In addition, by placing the cylindrical member 34 and the flow restriction portion 82a (see FIG. 2) of the channel-shaped member 82 in contact in the up-down direction, the bottom face of the cutout portion becomes the lowermost portion of the opening portion 52b included in the open flow passage portion 52a.

(3) In the embodiment described above, as an example, the channel-shaped member 82 includes the flow restriction portion 82a. However, the embodiments of the present invention are not limited to this example, and a configuration in which the channel-shaped member 82 does not include the flow restriction portion 82a is also naturally conceivable. In such case, a lowermost portion of the inner circumferential face on the end portion of the channel-shaped member 82 on the other axial side serves as the second supply portion 32.

(4) In the embodiment described above, as an example, the drive system 1 includes the oil introduction mechanism 100 that supplies oil raked up by the rotation of the output shaft 4 to the bearing supply oil passage 52. However, the embodiments of the present invention are not limited to this example, and a configuration in which the drive system 1 does not include the oil introduction mechanism 100 and oil is supplied to the bearing supply oil passage 52 by a hydraulic pressure generated by an oil pump (e.g. an electric oil pump) is also conceivable.

(5) In the embodiment described above, as an example, the closed flow passage portion 52c is formed by a recessed groove that is provided on the mating face of the pump cover 80 at the joined portion 72 between the pump cover 80 and the overlapping wall portion 71 11. However, the embodiments of the present invention are not limited to this example. A configuration may be used in which the closed flow passage portion 52c is formed by a recessed groove provided on the mating face of the overlapping wall portion 71 at the joined portion 72. Alternatively, a configuration may be used in which the closed flow passage portion 52c is formed by recessed grooves provided on both the mating face of the pump cover 80 and the mating face of the overlapping wall portion 71 at the joined portion 72.

(6) In the embodiment described above, as an example, the closed flow passage portion 52c is formed at the joined portion 72 between the pump cover 80 and the overlapping wall portion 71. However, the embodiments of the present invention are not limited to this example, and the closed flow passage portion 52c may be configured by a hole made in the cover portion 70 or the pump cover 80, or an oil passage pipe, or the like. Specifically, the bearing supply oil passage 52 may be configured without a flow passage formed by a recessed groove that is provided on at least one of the mating face of the overlapping wall portion 71 and the mating face of the pump cover 80 at the joined portion 72 between the pump cover 80 and the overlapping wall portion 71.

(7) In the embodiment described above, as an example, the oil supply hole 33 is provided above the opening portion 52b provided in the open flow passage portion 52a. However, the embodiments of the present invention are not limited to this example, and the oil supply hole 33 may also be shifted in the axial direction with respect to the opening portion 52b.

(8) In the embodiment described above, as an example, the bearing supply oil passage 52 includes the open flow passage portion 52a and the closed flow passage portion 52c. However, the embodiments of the present invention are not limited to this example, and a configuration in which the bearing supply oil passage 52 does not include at least one of either the open flow passage portion 52a and the closed flow passage portion 52c is also conceivable. Note that for a configuration in which the bearing supply oil passage 52 does not include the open flow passage portion 52a, the second supply portion 32 may be a hole portion that is formed in a member that forms the bearing supply oil passage 52, for example.

(9) In the embodiment described above, as an example, the pump cover 80 corresponds to a "flow passage formation member" of the present invention. However, the embodiments of the present invention are not limited to this example, and a configuration in which the flow passage formation member is a separate member from the member that constitutes the oil pump 10 is also naturally conceivable.

(10) In the embodiment described above, as an example, the power-distributing differential gear device 6 is a single pinion type of planetary gear mechanism that includes the three rotation elements of the sun gear 6a, the carrier 6b, and the ring gear 6c. However, the embodiments of the present invention are not limited to this example, and the power-distributing differential gear device 6 may also be configured as a double pinion type of planetary gear mechanism that includes three rotation elements. Further, the power-distributing differential gear device 6 may also be configured by a differential gear mechanism that includes four or more (e.g. four) rotation elements.

Figure 9:
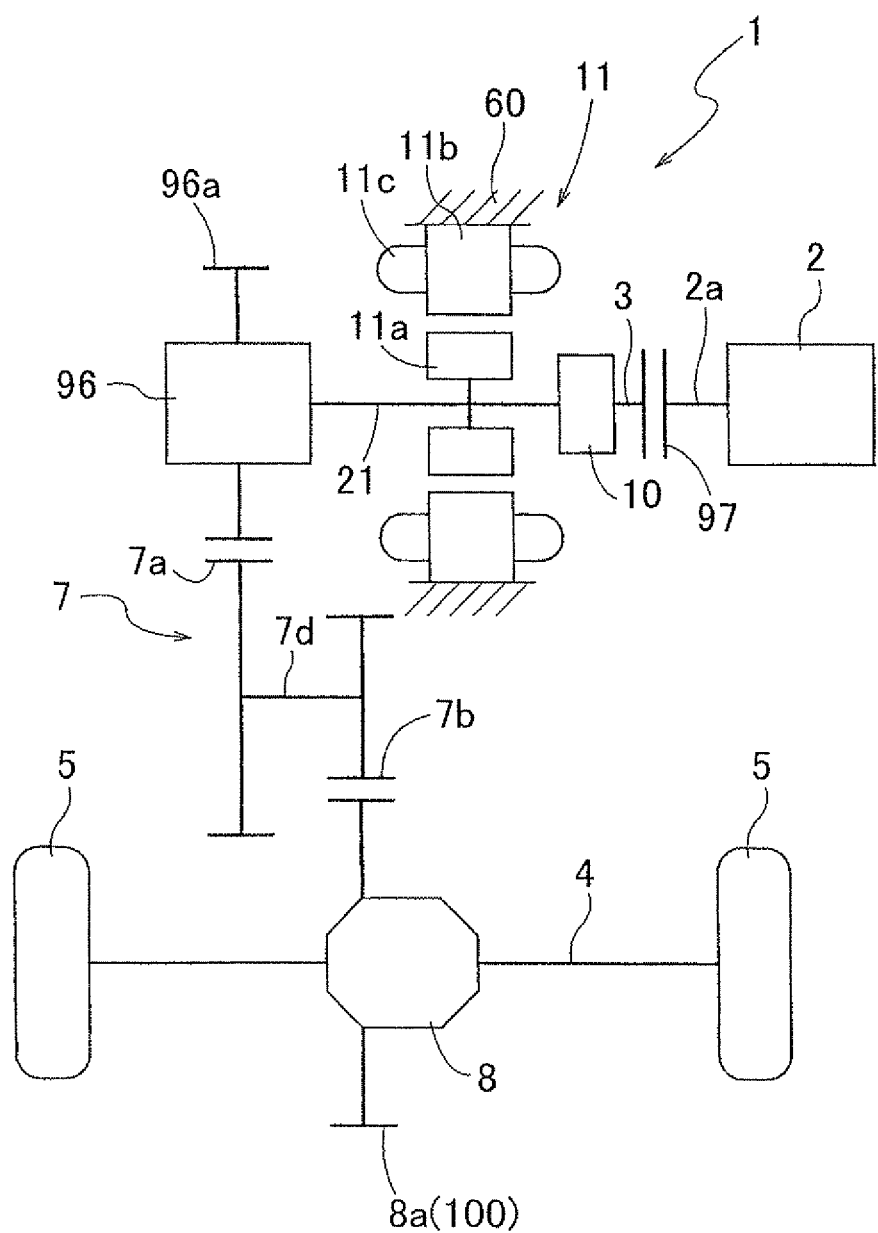
FIG. 9 is a schematic diagram that shows the overall configuration of the vehicle drive system according to still yet another embodiment of the present invention.

(11) In the embodiment described above, as an example, the drive system 1 is a so-called power-split type of hybrid drive system with a configuration that includes the power-distributing differential gear device 6, with the first dynamo electric machine 11 drive-coupled to the input shaft 3 through the power-distributing differential gear device 6. However, the embodiments of the present invention are not limited to this example, and the drive system 1 may have a configuration that does not include the power-distributing differential gear device 6. In such case, as shown in FIG. 9 for example, the drive system 1 may be a one-motor parallel type of hybrid drive system that includes only the first dynamo electric machine 11 as a dynamo electric machine. The same reference numerals are used for members in FIG. 9 that have the same functions as those in FIG. 1. Reference numerals 96, 96a, 97 respectively indicate a transmission device, a transmission output gear, and a clutch. Also, a torque converter may be further provided in the configuration shown in FIG. 9. In such case, the torque converter may be disposed between the internal combustion engine 2 and the oil pump 10, or disposed between the first dynamo electric machine 11 and the transmission device 96, for example.

(12) In the embodiment described above, as an example, the drive system 1 is a drive system for a hybrid vehicle. However, the embodiments of the present invention are not limited to this example. Accordingly, the drive system 1 is also suitable as a drive system for an electric vehicle that does not include an internal combustion engine as a drive source, for example.

(13) The embodiments disclosed in the present specification are merely illustrative examples in all respects regarding other configurations as well, and the embodiments of the present invention are not limited to those described herein. That is, constitutions that partially modify as appropriate configurations not described in the claims are naturally included in the technical scope of the present invention, provided the constitutions include a configuration described in the claims of the present application or an equivalent configuration.

The present invention is well-suited for use in a vehicle drive system that includes a dynamo electric machine and a case that accommodates the dynamo electric machine, wherein the case is disposed on either axial side with respect to the dynamo electric machine, and the case includes a wall portion overlapping the dynamo electric machine which has a section that overlaps with the dynamo electric machine as viewed from the axial direction.

What is claimed is:

1. A vehicle drive system comprising:
a dynamo electric machine; and
a case that accommodates the dynamo electric machine, wherein
the case is disposed on at least one axial side with respect to the dynamo electric machine, and includes a wall portion overlapping the dynamo electric machine which has a section that overlaps with the dynamo electric machine as viewed from the axial direction, wherein
the wall portion overlapping the dynamo electric machine includes a supply flow passage through which lubricating-cooling fluid flows, and which is formed with a first supply portion that is a portion supplying lubricating-cooling fluid to a rotor support bearing that supports a rotor of the dynamo electric machine,
the first supply portion includes a throttle portion whose flow passage cross-sectional area is small compared to an upstream-side flow passage cross-sectional area in the flow direction of lubricating-cooling fluid,
the supply flow passage includes a second supply portion that is a portion supplying lubricating-cooling fluid to the dynamo electric machine and higher than the first supply portion,
the supply flow passage includes an open flow passage portion that has an opening portion, and a closed flow passage portion whose periphery is closed, wherein
the closed flow passage portion communicates with the open flow passage portion on the upstream side of the flow direction of lubricating-cooling fluid, and communicates with the first supply portion on the downstream side of the flow direction of lubricating-cooling fluid, and
a lowermost portion of the opening portion is the second supply portion.

2. The vehicle drive system according to claim 1, wherein the opening portion opens upward, and a lubricating-cooling fluid supply portion that supplies lubricating-cooling fluid to the supply flow passage is provided above the opening portion.

3. A vehicle drive system comprising:
a dynamo electric machine;
a case that accommodates the dynamo electric machine, the case being disposed on at least one axial side with respect to the dynamo electric machine, and includes a wall portion overlapping the dynamo electric machine which has a section that overlaps with the dynamo electric machine as viewed from the axial direction; and
a flow passage formation member that is attached to a face on the dynamo electric machine side in the axial direction of the wall portion overlapping the dynamo electric machine, wherein
the wall portion overlapping the dynamo electric machine includes a supply flow passage through which lubricating-cooling fluid flows, and which is formed with a first supply portion that is aportion supplying lubricating-cooling fluid to a rotor support bearing that supports a rotor of the dynamo electric machine, the first supply portion includes a throttle portion whose flow passage cross-sectional area is small compared to an upstream-side flow passage cross-sectional area in the flow direction of lubricating-cooling fluid, the supply flow passage includes a second supply portion that is a portion supplying lubricating-cooling fluid to the dynamo electric machine and higher than the first supply portion, and the supply flow passage has a flow passage that is formed by a recessed groove provided on at least one of a mating face of the flow passage formation member and a mating face of the wall portion overlapping the dynamo electric machine at a joined portion between the flow passage formation member and the wall portion overlapping the dynamo electric machine.

4. A vehicle drive system comprising:

a dynamo electric machine: and a case that accommodates the dynamo electric machine, wherein the case is disposed on at least one axial side with respect to the dynamo electric machine, and includes a wall portion overlapping the dynamo electric machine which has a section that overlaps with the dynamo electric machine as viewed from the axial direction, wherein the wall portion overlapping the dynamo electric machine includes a supply flow passage through which lubricating-cooling fluid flows, and which is formed with a first supply portion that is a portion supplying lubricating-cooling fluid to a rotor support bearing that supports a rotor of the dynamo electric machine, the first supply portion includes a throttle portion whose flow passage cross-sectional area is small compared to an upstream-side flow passage cross-sectional area in the flow direction of lubricating-cooling fluid, and the supply flow passage includes a second supply portion that is a portion supplying lubricating-cooling fluid to the dynamo electric machine and higher than the first supply portion, the vehicle drive system further comprising a guidance member that guides lubricating-cooling fluid supplied from the second supply portion to a predetermined location of the dynamo electric machine to be supplied with lubricating-cooling fluid, wherein the guidance member includes a guidance face that extends from the second supply portion side toward the dynamo electric machine side downward at an angle with respect to the horizontal direction.

5. The vehicle drive system according to claim 1, further comprising:

an output member that is drive-coupled to a wheel; and a lubricating-cooling introduction mechanism that supplies lubricating-cooling fluid raked up by the rotation of the output member to the supply flow passage.

6. The vehicle drive system according to claim 5, further comprising:

a first dynamo electric machine that is said dynamo electric machine;

a second dynamo electric machine separate from the first dynamo electric machine;

an input member that is drive-coupled to an internal combustion engine;

a mechanical pump that operates based on the rotation of the input member; and a differential gear device that includes at least a first rotation element, a second rotation element, and a third rotation element, wherein the first dynamo electric machine is drive-coupled to the first rotation element, the input member is drive-coupled to the second rotation element, and the second dynamo electric machine and the output member are drive-coupled to the third rotation element, and in an electric running mode in which the internal combustion engine is stopped and the torque of the second dynamo electric machine is transmitted to the output member to drive the wheel, lubricating-cooling fluid is supplied to the supply flow passage.

7. The vehicle drive system according to claim 1 further comprising:

a flow passage formation member that is attached to a face on the dynamo electric machine side in the axial direction of the wall portion overlapping the dynamo electric machine, wherein the supply flow passage has a flow passage that is formed by a recessed groove provided on at least one of a mating face of the flow passage formation member and a mating face of the wall portion overlapping the dynamo electric machine at a joined portion between the flow passage formation member and the wall portion overlapping the dynamo electric machine.

8. The vehicle drive system according to claim 1, further comprising:

a guidance member that guides lubricating-cooling fluid supplied from the second supply portion to a predetermined location of the dynamo electric machine to be supplied with lubricating-cooling fluid, wherein the guidance member includes a guidance face that extends from the second supply portion side toward the dynamo electric machine side downward at an angle with respect to the horizontal direction.

9. The vehicle drive system according to claim 4, further comprising:

an output member that is drive-coupled to a wheel; and a lubricating-cooling introduction mechanism that supplies lubricating-cooling fluid raked up by the rotation of the output member to the supply flow passage.

10. The vehicle drive system according to claim 9, further comprising:

a first dynamo electric machine that is said dynamo electric machine;

a second dynamo electric machine separate from the first dynamo electric machine;

an input member that is drive-coupled to an internal combustion engine;

a mechanical pump that operates based on the rotation of the input member; and a differential gear device that includes at least a first rotation element, a second rotation element, and a third rotation element, wherein the first dynamo electric machine is drive-coupled to the first rotation element, the input member is drive-coupled to the second rotation element, and the second dynamo electric machine and the output member are drive-coupled to the third rotation element, and in an electric running mode in which the internal combustion engine is stopped and the torque of the second dynamo electric machine is transmitted to the output member to drive the wheel, lubricating-cooling fluid is supplied to the supply flow passage.

11. The vehicle drive system according to claim 4 further comprising:

a flow passage formation member that is attached to a face on the dynamo electric machine side in the axial direction of the wall portion overlapping the dynamo electric machine, wherein the supply flow passage has a flow passage that is formed by a recessed groove provided on at least one of a mating face of the flow passage formation member and a mating face of the wall portion overlapping the dynamo electric machine at a joined portion between the flow passage formation member and the wall portion overlapping the dynamo electric machine.

12. The vehicle drive system according to claim 11, further comprising:

a guidance member that guides lubricating-cooling fluid supplied from the second supply portion to a predetermined location of the dynamo electric machine to be supplied with lubricating-cooling fluid, wherein the guidance member includes a guidance face that extends from the second supply portion side toward the dynamo electric machine side downward at an angle with respect to the horizontal direction.

13. The vehicle drive system according to claim 12, further comprising:

an output member that is drive-coupled to a wheel; and a lubricating-cooling introduction mechanism that supplies lubricating-cooling fluid raked up by the rotation of the output member to the supply flow passage.

14. The vehicle drive system according to claim 13, further comprising:

a first dynamo electric machine that is said dynamo electric machine;

a second dynamo electric machine separate from the first dynamo electric machine;

an input member that is drive-coupled to an internal combustion engine;

a mechanical pump that operates based on the rotation of the input member; and a differential gear device that includes at least a first rotation element, a second rotation element, and a third rotation element, wherein the first dynamo electric machine is drive-coupled to the first rotation element, the input member is drive-coupled to the second rotation element, and the second dynamo electric machine and the output member are drive-coupled to the third rotation element, and in an electric running mode in which the internal combustion engine is stopped and the torque of the second dynamo electric machine is transmitted to the output member to drive the wheel, lubricating-cooling fluid is supplied to the supply flow passage.

15. The vehicle drive system according to claim 4, further comprising:

a guidance member that guides lubricating-cooling fluid supplied from the second supply portion to a predetermined location of the dynamo electric machine to be supplied with lubricating-cooling fluid, wherein the guidance member includes a guidance face that extends from the second supply portion side toward the dynamo electric machine side downward at an angle with respect to the horizontal direction.

16. The vehicle drive system according to claim 15, further comprising:

an output member that is drive-coupled to a wheel; and a lubricating-cooling introduction mechanism that supplies lubricating-cooling fluid raked up by the rotation of the output member to the supply flow passage.

17. The vehicle drive system according to claim 16, further comprising:

a first dynamo electric machine that is said dynamo electric machine;

a second dynamo electric machine separate from the first dynamo electric machine;

an input member that is drive-coupled to an internal combustion engine;

a mechanical pump that operates based on the rotation of the input member; and a differential gear device that includes at least a first rotation element, a second rotation element, and a third rotation element, wherein the first dynamo electric machine is drive-coupled to the first rotation element, the input member is drive-coupled to the second rotation element, and the second dynamo electric machine and the output member are drive-coupled to the third rotation element, and in an electric running mode in which the internal combustion engine is stopped and the torque of the second dynamo electric machine is transmitted to the output member to drive the wheel, lubricating-cooling fluid is supplied to the supply flow passage.

18. The vehicle drive system according to claim 3, further comprising:

a guidance member that guides lubricating-cooling fluid supplied from the second supply portion to a predetermined location of the dynamo electric machine to be supplied with lubricating-cooling fluid, wherein the guidance member includes a guidance face that extends from the second supply portion side toward the dynamo electric machine side downward at an angle with respect to the horizontal direction.

19. The vehicle drive system according to claim 18, further comprising:

an output member that is drive-coupled to a wheel; and a lubricating-cooling introduction mechanism that supplies lubricating-cooling fluid raked up by the rotation of the output member to the supply flow passage.

20. The vehicle drive system according to claim 19, further comprising:

a first dynamo electric machine that is said dynamo electric machine;

a second dynamo electric machine separate from the first dynamo electric machine;

an input member that is drive-coupled to an internal combustion engine;

a mechanical pump that operates based on the rotation of the input member; and a differential gear device that includes at least a first rotation element, a second rotation element, and a third rotation element, wherein the first dynamo electric machine is drive-coupled to the first rotation element, the input member is drive-coupled to the second rotation element, and the second dynamo electric machine and the output member are drive-coupled to the third rotation element, and in an electric running mode in which the internal combustion engine is stopped and the torque of the second dynamo electric machine is transmitted to the output member to drive the wheel, lubricating-cooling fluid is supplied to the supply flow passage.

* * * * *